(12) United States Patent
Yang et al.

(10) Patent No.: US 11,954,350 B2
(45) Date of Patent: Apr. 9, 2024

(54) STORAGE DEVICE AND METHOD OF OPERATING THE SAME

(71) Applicant: SK hynix Inc., Gyeonggi-do (KR)

(72) Inventors: Soon Yeal Yang, Gyeonggi-do (KR); Jung Ki Noh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/752,147

(22) Filed: May 24, 2022

(65) Prior Publication Data
US 2022/0382454 A1    Dec. 1, 2022

Related U.S. Application Data

(60) Provisional application No. 63/192,877, filed on May 25, 2021.

(30) Foreign Application Priority Data

Jun. 30, 2021   (KR) ........................ 10-2021-0086013
May 17, 2022   (KR) ........................ 10-2022-0060487

(51) Int. Cl.
     *G06F 3/06*           (2006.01)

(52) U.S. Cl.
     CPC ............ *G06F 3/064* (2013.01); *G06F 3/0604* (2013.01); *G06F 3/0631* (2013.01);
(Continued)

(58) Field of Classification Search
     CPC ...... G06F 3/064; G06F 3/0604; G06F 3/0631; G06F 3/0652; G06F 3/0658;
(Continued)

(56) References Cited

U.S. PATENT DOCUMENTS 9,489,296 B1    11/2016   Tomlin et al.
2007/0011321 A1    1/2007   Huntington et al.
(Continued)

FOREIGN PATENT DOCUMENTS

KR    10-2018-0083093 A    7/2018
KR    10-2019-0141070 A    12/2019
(Continued)

OTHER PUBLICATIONS

Notice of Allowance for the U.S. Appl. No. 17/752,128 issued by the USPTO dated Jun. 5, 2023.
(Continued)

*Primary Examiner* — Masud K Khan
(74) *Attorney, Agent, or Firm* — IP & T GROUP LLP

(57) ABSTRACT

A storage device includes a memory device, and a memory controller configured to receive data and a log related to a property of the data from an external host, allocate a super block in which the data in the memory device is to be stored and a physical zone in the super block based on the log of the data, and store information for the log of the data stored for each physical zone and a time point at which a physical zone of a full state in which an empty area does not exist is switched to the full state. The memory controller controls the memory device to perform garbage collection according to the number of physical zones of an empty state, and selects a victim physical zone based on the information for the log of the data and a full state switch time point.

20 Claims, 23 Drawing Sheets

(52) U.S. Cl.
CPC .......... *G06F 3/0652* (2013.01); *G06F 3/0658* (2013.01); *G06F 3/0679* (2013.01)

(58) Field of Classification Search
CPC .......... G06F 3/0679; G06F 2212/1016; G06F 2212/1032; G06F 2212/1044; G06F 2212/7205; G06F 2212/7208; G06F 12/0246; G06F 3/061; G06F 3/0644; G06F 3/0656; G06F 3/0683
See application file for complete search history.

(56) References Cited

U.S. PATENT DOCUMENTS

| | | | | |
|---|---|---|---|---|
| 2010/0268876 | A1* | 10/2010 | Reid | ..... G06F 3/0604 711/E12.001 |
| 2016/0210066 | A1 | 7/2016 | Yamaura et al. | |
| 2018/0018091 | A1 | 1/2018 | Shin et al. | |
| 2019/0087284 | A1 | 3/2019 | Kim et al. | |
| 2019/0129840 | A1* | 5/2019 | Kanno | ..... G11C 29/765 |
| 2019/0129862 | A1 | 5/2019 | Yoshida et al. | |
| 2019/0310774 | A1* | 10/2019 | Oh | ..... G11C 29/44 |
| 2020/0125292 | A1 | 4/2020 | Byun | |
| 2021/0216418 | A1* | 7/2021 | Han | ..... G06F 11/3466 |
| 2022/0365710 | A1* | 11/2022 | Golov | ..... G11C 7/04 |

FOREIGN PATENT DOCUMENTS

| | | | |
|---|---|---|---|
| KR | 10-2020-0019653 A | 2/2020 | |
| WO | WO-2016162981 A1 * | 10/2016 | ..... G06F 12/10 |

OTHER PUBLICATIONS

1 Notice of Allowance issued for the U.S. Appl. No. 17/752,449 issued by the USPTO dated Feb. 6, 2024.
Office Action issued for the U.S. Appl. No. 17/752,449 issued by the USPTO dated Oct. 19, 2023.

* cited by examiner

Candidate of New Section

STORAGE DEVICE AND METHOD OF OPERATING THE SAME

CROSS-REFERENCE TO RELATED APPLICATION

The present application claims benefit under 35 U.S.C. § 119(e) of U.S. Provisional Patent Application No. 63/192,877, filed on May 25, 2021, Korean patent application number 10-2021-0086013, filed on Jun. 30, 2021 and Korean patent application number 10-2022-0060487, filed on May 17, 2022, the entire disclosure of which is incorporated by reference herein.

BACKGROUND

1. Field of Invention

The present disclosure relates to an electronic device, and more particularly, to a storage device and a method of operating the same.

2. Description of Related Art

A storage device converts a logical address received from a host into a physical address and uses the physical address, and thus a logical area in the host and a physical zone of the storage device are related to each other. Accordingly, in order to improve performance of an electronic device, a new device or method capable of controlling the host and the storage device is required.

SUMMARY

An embodiment of the present disclosure provides a storage device and a method of operating the same capable of efficient management for each characteristic of data.

According to an embodiment of the present disclosure, a storage device may include a memory device including a plurality of memory dies; and a memory controller configured to receive data and a log related to a property of the data from an external host, allocate, in the memory device and based on the log, a super block, in which the data is to be stored, and a physical zone in the super block, and store information for the log of the data, which is stored in the physical zone, and a time point, at which the physical zone is switched to a full state. The memory controller may be configured to control, according to a number of physical zones of an empty state, the memory device to perform garbage collection by selecting a victim physical zone based on information for the log and the time point, and wherein a physical zone of the full state is full of data stored therein and a physical zone of the empty state has no data stored therein.

According to an embodiment of the present disclosure, a method of operating a storage device, which includes a memory device including a plurality of memory dies, and a memory controller configured to receive data and a log related to a property of the data from an external host, allocate, in the memory device and based on the log, a super block, in which the data is to be stored, and a physical zone included in the super block, the method comprising: determining whether to perform garbage collection based on a number of physical zones of an empty state; selecting candidate physical zones from among physical zones of a full state; and determining a victim physical zone based on the log of the data, which is stored in each of the candidate physical zones, and a time point at which each of the candidate physical zones is switched to the full state, wherein a physical zone of the full state is full of data stored therein and a physical zone of the empty state has no data stored therein.

According to an embodiment of the present disclosure, a storage device may include a memory device including a plurality of memory dies; and a memory controller configured to divide the memory device into a plurality of super blocks and control the memory device, wherein each of one or more super blocks among the plurality of super blocks includes a plurality of physical zones each including a portion of each of memory blocks included in different memory dies. The memory controller may be configured to control the memory device to perform garbage collection based on information on the physical zones.

According to an embodiment of the present disclosure, an operating method of operating a controller may include selecting, when a number of empty storage units becomes less than a threshold, a super block only having full storage units and ready-to-reset storage units based on costs of super blocks, the cost being defined by a log and a time point of each of full storage units within the respective super blocks; and controlling a memory device to perform a garbage collection operation on the full storage units within the selected super block. The empty storage unit may be full of empty space available to store data therein, the full storage unit may be full of data stored therein, the log may be related to at least an access frequency of data stored in a corresponding full storage unit and is provided from an external, and the time point may indicate when a corresponding full storage unit becomes full of data stored therein.

According to an embodiment of the present disclosure, an operating method of operating a controller may include selecting, when a number of empty storage units becomes between first and second thresholds, a victim storage unit. The empty storage unit may be full of empty space available to store data therein, the full storage unit may be full of data stored therein, the log may be related to at least an access frequency of data stored in a corresponding full storage unit and is provided from an external, and the time point may indicate when a corresponding full storage unit becomes full of data stored therein.

The present technology provides a storage device and a method of operating the same capable of efficient management for each characteristic of data.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
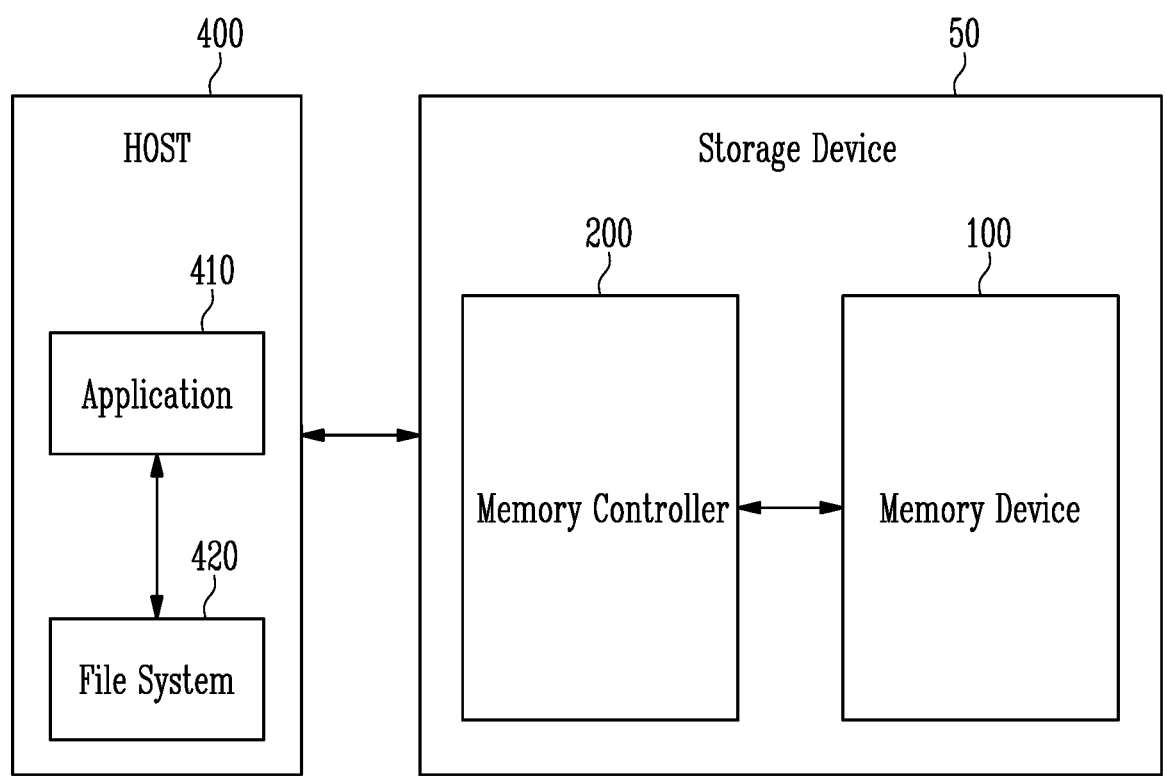
FIG. 1 is a diagram illustrating an electronic device including a storage device according to an embodiment of the present disclosure.

FIG. 1 is a diagram illustrating an electronic device including a storage device according to an embodiment of the present disclosure.

Referring to FIG. 1, the storage device 50 may include a memory device 100 and a memory controller 200. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under control of the host 400 that stores high-size data in one place, such as a server or a data center.

The storage device 50 may be manufactured as one of various types of storage devices according to a host interface that is a communication method with the host 400. For example, the storage device 50 may be configured as one of various types of storage devices such as an SSD, a multi-media card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as one of various types of packages. For example, the storage device 50 may be manufactured as one of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change RAM (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

In an embodiment, the memory controller 200 may receive data and a logical address (LA) from the host 400, and the memory controller 200 may include a firmware (not shown) capable of converting the LA into a physical address (PA) indicating an address of memory cells to which data included in the memory device 100 is to be stored. In addition, the memory controller 200 may store a logical-physical address mapping table configuring a mapping relationship between the LA and the PA in a buffer memory.

The memory controller 200 may control the memory device 100 to perform the program operation, the read operation, or the erase operation according to a request of the host 400. During the program operation, the memory controller 200 may provide a program command, the PA, and data to the memory device 100. During the read operation, the memory controller 200 may provide a read command and the PA to the memory device 100. During the erase operation, the memory controller 200 may provide an erase command and the PA to the memory device 100. Alternatively, the memory controller 200 may open or close a physical zone in the memory device 100 according to a request of the host 400. Opening the physical zone may be generating a map table for a logical address group corresponding to a corresponding physical zone, for example, LAs corresponding to a section allocated with respect to data by the host. Closing the physical zone may indicate that a write request storing data in a corresponding zone does not exist until an open request is received again with respect to the physical zone. The host 400 may provide a request to open or close such a physical zone as a separate request, or may provide the request together with another request such as a write request.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the program operation, the read operation, and the erase operation accompanying in performing wear leveling, read reclaim, garbage collection, and the like, to the memory device 100.

In an embodiment, the memory controller 200 may include a flash translation layer. The flash translation layer may convert the LA corresponding to the request received from the host 400 into the PA and output the PA to the memory device 100.

For example, as described above, the flash translation layer may convert an LA corresponding to a program request into the PA, or convert an LA corresponding to a read request into the PA, or convert an LA corresponding to an erase request into the PA. The flash translation layer may output the converted PA to the memory device 100, and the memory device 100 may perform an operation on a page or a memory block corresponding to the PA.

In an embodiment, the memory controller 200 may receive LAs from a file system 420 and convert the received LAs into successive PAs. When the successive PAs are output to the memory device 100, the memory device 100 may perform successive operations corresponding to the successive PAs. At this time, the successive PAs may be determined according to a type of an allocated physical zone. The type of the physical zone is described in more detail with reference to FIGS. 5, 6, and the like.

In an embodiment, the storage device 50 may further include the buffer memory (not shown). The memory controller 200 may control data exchange between the host 400 and the buffer memory (not shown). Alternatively, the memory controller 200 may temporarily store system data for control of the memory device 100 in the buffer memory. For example, the memory controller 200 may temporarily store data input from the host 400 in the buffer memory, and then transmit the data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR) or a Rambus dynamic random access memory (RDRAM), or a static random access memory (SRAM).

In various embodiments, the buffer memory may be connected from an outside of the storage device 50. In this case, volatile memory devices connected to the outside of the storage device 50 may serve as buffer memories.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other. Alternatively, the interleaving method may be a method of controlling operations on a plurality of groups divided within one memory device 100 to overlap. At this time, a group may be one or more memory die units or one or more memory plane units.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 400 may include an application 410. The application 410 may be also referred to as an application program, and may be software executed on an operating system (OS). The application 410 may process data in response to a user input. For example, the application 410 may process data in response to the user input, and transmit a request for storing the processed data in the memory device 100 of the storage device 50 to the file system 420.

The file system 420 may allocate an LA to which data is to be stored, in response to the request transmitted from the application. In an embodiment, the file system 420 may be a log structure file system (LFS). The LFS may generate a log in consideration of a property of input data, and allocate a section corresponding to data based on the log. At this time, the section may be a set of LAs. Therefore, allocation of the section may mean that LAs corresponding to corresponding data are allocated. The data to which the section is allocated may be sequentially stored in a storage area of the memory device 100 corresponding to the section. For example, the LFS may be a flash friendly file system (F2FS). The F2FS may be a log-based file system designed in consideration of a characteristic of a solid state drive (SSD), and may increase an internal parallelism of the SSD by using a multi-head log. Different sections may be allocated to data for which different logs are generated. The LFS may not overwrite data. When the LFS corrects data, the LFS may newly allocate an LA corresponding to data to be corrected and write the data to a physical zone corresponding thereto.

Data requested to be written by the application 410 may be stored in a host memory (not shown) in the host, and may be flushed to the storage device 50 according to a request from the application by a device interface (not shown). The host memory may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 2:
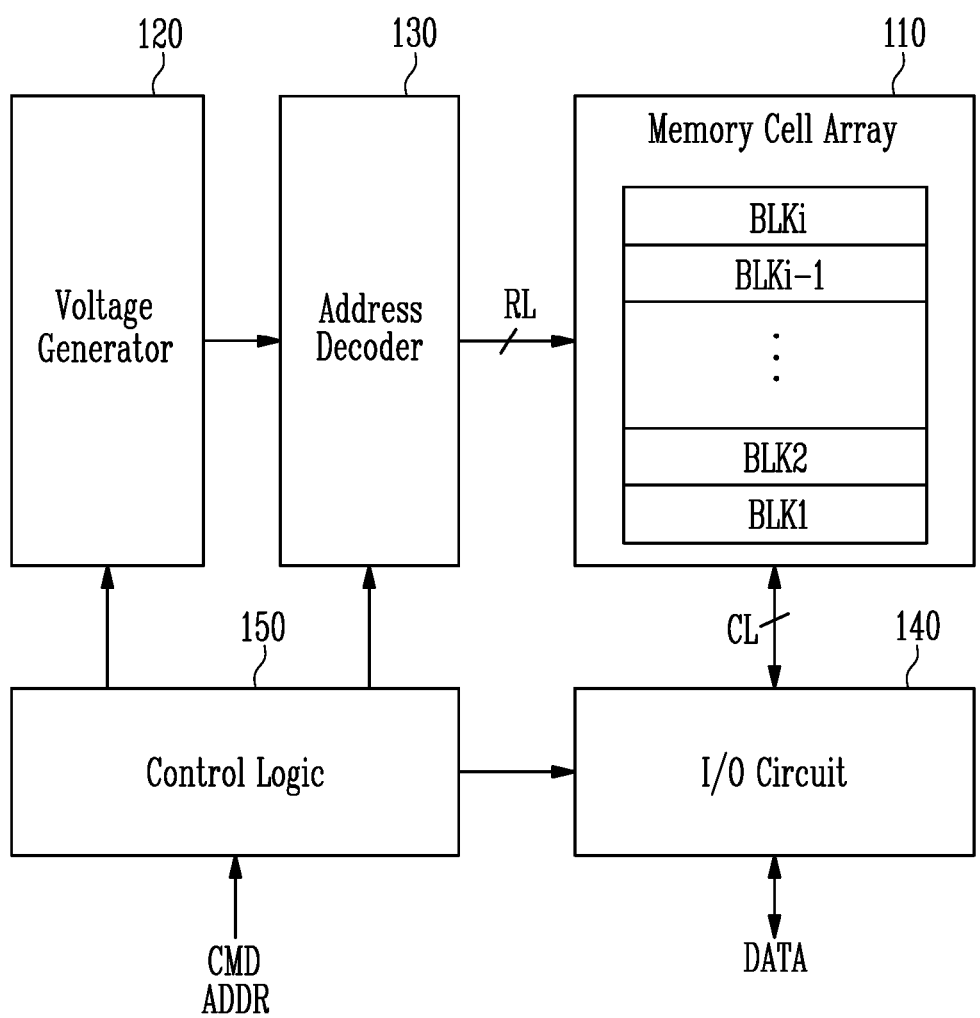
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

In an embodiment, the memory cell array 110 may include one or more memory dies, and each memory die may include one or more planes including one or more memory blocks.

In addition, the plurality of memory blocks BLK included in the memory cell array 110 may be grouped into two or more super blocks. The super block may be a unit in which the control logic 150 manages the plurality of memory blocks BLK included in the memory cell array 110. The super block may include the plurality of memory blocks BLK. One super block may be a set of memory blocks BLK on which the read operation, the write operation, and/or the like are/is performed simultaneously or in the same time period, the read operation, the write operation, and/or the like are/is performed in conjunction with or in relation to each other, a set of memory blocks BLK on which the read operation, the write operation, and/or the like are/is performed with respect to one command, or a set of memory blocks BLK on which the read operation, the write operation, and/or the like are/is performed in conjunction with each other or simultaneously. In addition, a group of memory blocks BLK distinguished from each other in terms of management or an operation among the plurality of memory blocks BLK may be referred to as the super block. In an embodiment, one super block may store data classified into the same data type. All sizes of each of two or more super blocks may be the same. That is, all numbers of memory blocks BLK included in each of the two or more super blocks may be the same. Alternatively, a size of at least one of the two or more super blocks may be different from that of the remaining super block. That is, the number of memory blocks BLK included in at least one super block among the plurality of super blocks may be different from the number of memory blocks BLK included in the remaining super block. In addition, all of the two or more memory blocks BLK included in each of the two or more super blocks may be positioned in the same memory die. Alternatively, the two or more memory blocks BLK included in each of the two or more super blocks may be positioned in two or more different memory dies.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
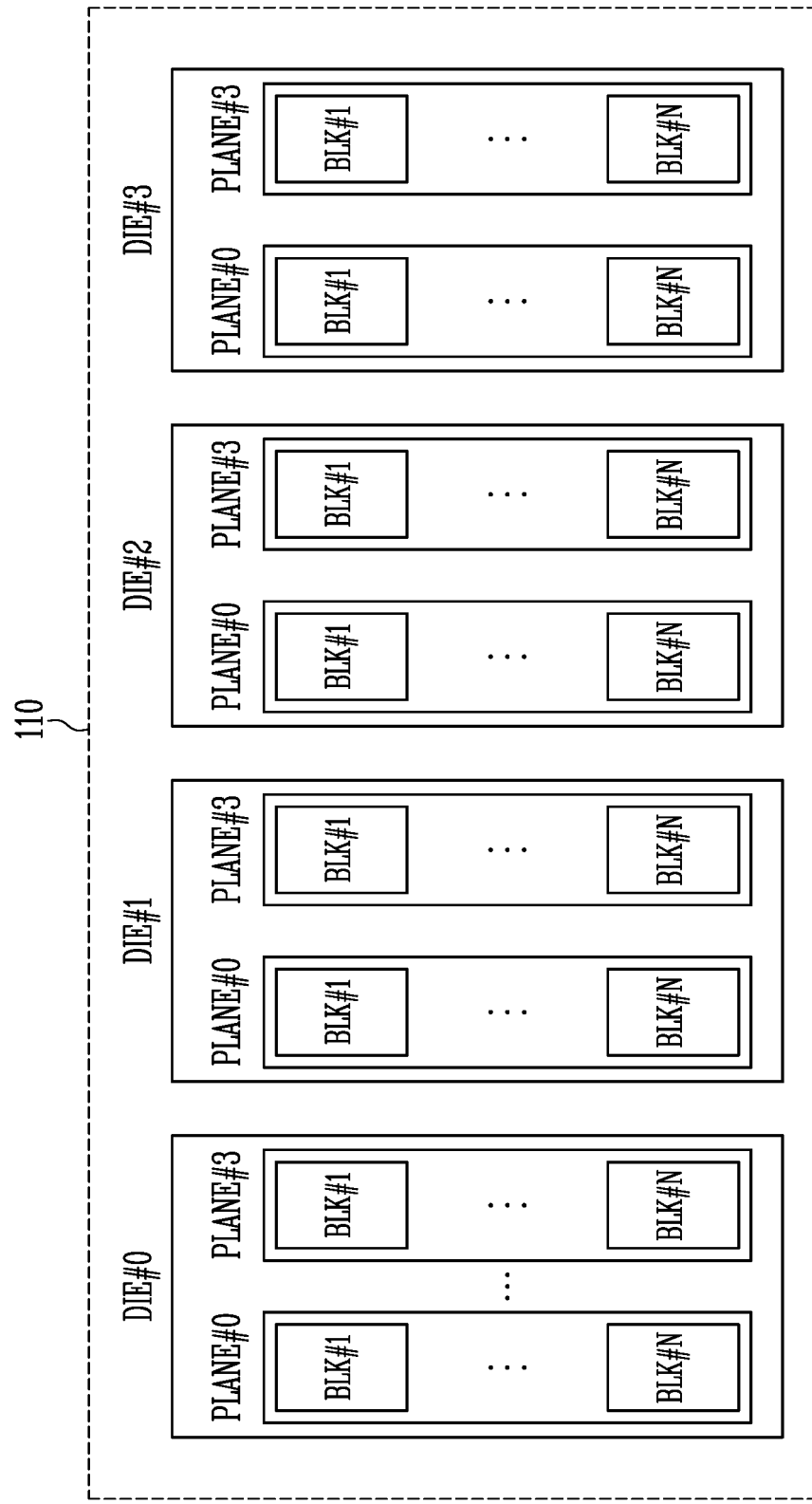
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the memory cell array 110 may include one or more memory dies, and each memory die may include one or more planes including one or more memory blocks. In FIG. 3, the memory cell array 110 includes four memory dies DIE #0, DIE #1, DIE #2, and DIE #3, but the number of memory dies is not limited thereto. The plurality of memory dies may perform transmission and reception with the memory controller through a plurality of channels, and each channel may be connected to one or more memory dies. For example, when one channel is connected to one memory die, one memory die may receive one command at a time, and the planes included in one memory die may process commands received by the memory die in parallel.

Figure 4:
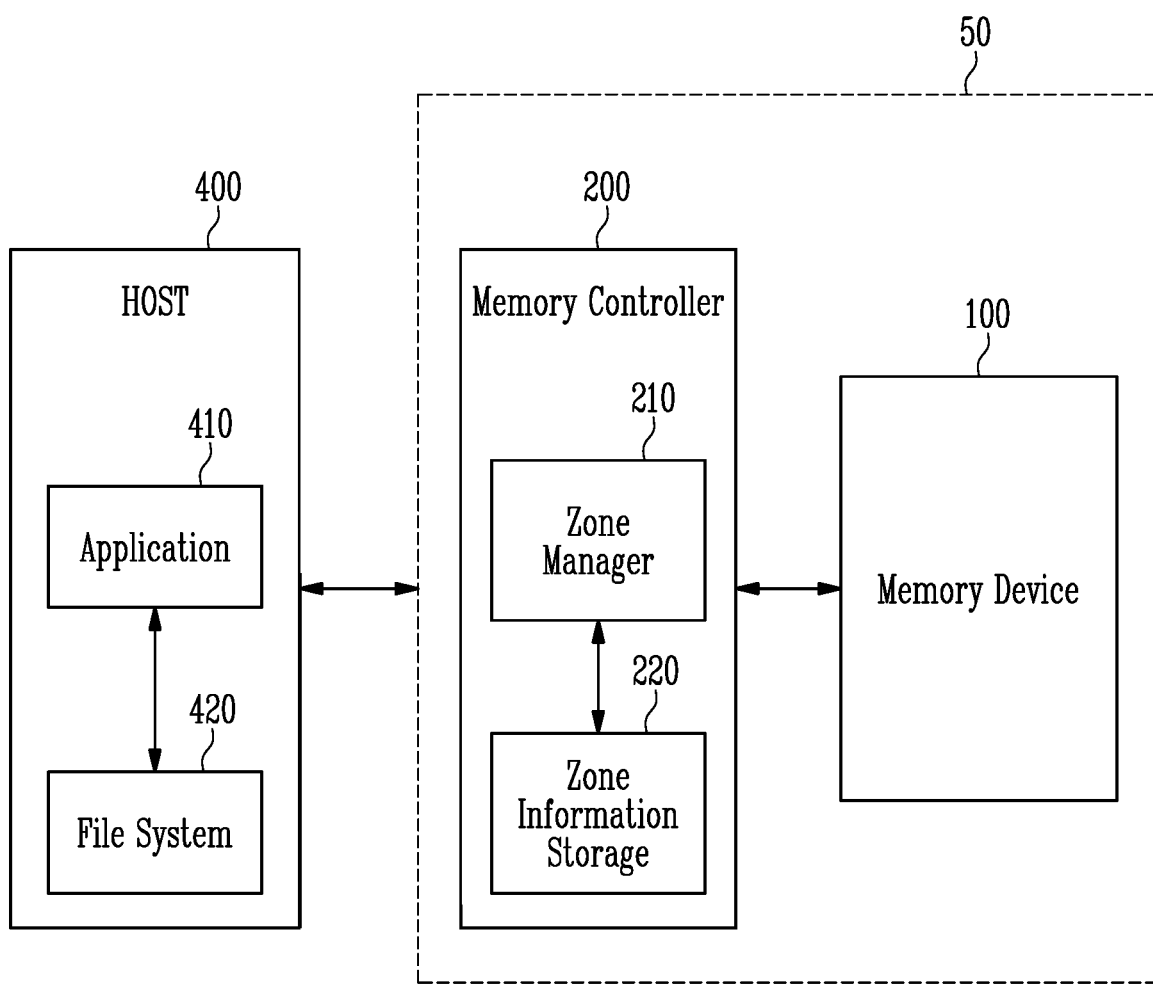
FIG. 4 is a diagram illustrating a storage device according to an embodiment of the present disclosure.

FIG. 4 is a diagram illustrating a storage device according to an embodiment of the present disclosure.

Referring to FIG. 4, the file system 420 of the host device may generate a log for a property of data in response to a request from the application 410 requesting to write data, and allocate a section corresponding to the data based on the log. The section may be a group of a plurality of LAs, and allocating the section corresponding to the data may mean allocating some or all of the plurality of LAs included in the section to the corresponding data. In an embodiment, the plurality of LAs corresponding to one section may be successive LAs. Alternatively, the plurality of LAs corresponding to one section may not be successive, but information on the LAs included in each section may be stored in a memory in the host, a memory on the storage device, or the like, and the LA for each section may be managed. In addition, the file system 420 may determine a section group including the section based on the log allocated to the data. The section group may include a plurality of sections, and LAs included in sections in one section group may be successive. Alternatively, the LAs included in the sections in one section group may not be successive, but information on the LAs included in each section group may be stored in the memory in the host the memory on the storage device, or the like, and the LA for each section group may be managed. In an embodiment, the section group may include a first section group in which the file system allocates one of empty sections in the section group as a new section regardless of a section order in the section group, and a second section group in which the file system allocates the new section according to the section order in the section group.

In addition, the host 400 may provide the data to which the log and the section are allocated by the file system 420 to the storage device 50. In an example, the data may be provided to the storage device 50 through a device interface (not shown) in the host 400. The file system 420 may divide the memory device 100 in the storage device 50 into a plurality of areas and manage the memory device 100. In an embodiment, the file system 420 may divide a storage space in the memory device 100 into a check point area, a segment information table (Segment Info. Table, SIT), a node address table (NAT), a segment summary area (SSA), and a main area. The check point area may store a checkpoint. The checkpoint may be data that preserves a state up to a logical breakpoint of a system when a system stop event such as a sudden power off occurs during an operation of a computing system, and data may be recovered using the checkpoint. The SIT may include valid page information in each segment. The NAT may include an identifier for each node configuring an indexing tree of a file stored in the memory device 100 and a PA corresponding to each node identifier. The SSA may include summary information of each segment of the main area to be described later. The main area may be a space for storing various pieces of directory information, data, file information, and the like used by an actual user. In the present specification, all data and information stored in the main area are defined as data. At this time, the data stored in the main area may be classified into a node or data according to a type thereof. The node may mean an inode or index, and the data may mean a directory or user file data. In addition, the stored data may be classified according to a temperature, and the temperature of the data may be classified into hot, warm, and cold, respectively. Herein, the temperature of the data may indicate an access frequency of the data. Accordingly, the data may be classified into a hot node, a warm node, a cold node, hot data, warm data, cold data, and the like by the file system 420, and may be stored in the main area after the log is allocated. Therefore, the main area may be divided into virtual zones corresponding to the sections allocated by the file system 420, and a specific log may be allocated to each of the virtual zones. In addition, the virtual zones may be grouped and divided into virtual zone groups corresponding to the section group determined by the file system 420. In addition, each of the virtual zones may include a plurality of segments, and data may be sequentially stored in each segment. At this time, one segment may correspond to one, two, or more LAs. The virtual zones may be physically implemented in a host memory (not shown) in the host or a buffer memory device (not shown) of the storage device, or physically implemented by managing information on LAs included for each section and section group in the host memory or the buffer memory device.

The storage device 50 may include the memory controller 200 and the memory device 100, and the memory controller 200 may include a zone manager 210 and a zone information storage 220.

The memory controller 200 may receive data from the host 400. The data may be data to which the log and the section are allocated by the file system 420. The zone manager 210 may allocate a super block in which data is to be stored based on the log of the received data. The super block may include a plurality of physical zones, and a shape of the physical zone included therein is different according to a type of the super block, and thus allocating the super block may be determining the shape of the physical zone to which the data is stored. That is, it may be determined which physical zone is required to be included in a first physical zone including one or more memory blocks in one memory die and a second physical zone including a portion of each of the memory blocks included in different memory dies. At this time, a super block including a plurality of first physical zones may be referred to as a first super block, and a super block including a plurality of second physical zones may be referred to as a second super block. At this time, the data stored in the first super block may be data to which the section in the first section group is allocated by the file system 420, and the data stored in the second super block may be data to which the section in the second section group is allocated.

The zone manager 210 may provide information on the type of the physical zone in which data is to be stored to a flash translation layer (not shown), and the flash translation layer (not shown) may convert the LA of the data to which the section is allocated into the PA, based on the information on the type of the physical zone in which the data is to be stored. In an embodiment, the LAs included in the section may be assigned to the data to which the section is allocated, and the flash translation layer (not shown) may convert the LA of the data to be stored into successive PAs in the physical zone determined by the zone manager 210.

The flash translation layer (not shown) may transmit the converted PA to the zone manager 210, and the zone manager 210 may control the memory device 100 to store the data in the received PA.

In addition, the zone information storage 220 may store state information of each of the physical zones allocated by the zone manager 210. Each of the physical zones may be divided into a full state, an empty state, and an active state. The full state may mean a state in which data is stored in all areas in the physical zone and an empty area does not exist in the zone. The empty state may mean a state in which the physical zone is empty without data stored in an area in the physical zone. The active state may mean a state in which data is stored only in a partial area in the physical zone, and may be an open state or a closed state. The open state may mean a physical zone in which data is currently programmed among physical zones in which data is stored only in a partial area in the physical zone, and the closed state may mean a physical zone in which data is not currently programmed among the physical zones in which data is stored in a partial area in the physical zone. In addition, according to a type of the physical zone, the physical zone may further have a ready-to-reset state. The ready-to-reset state may mean a state in which a reset operation for causing the physical zone to be in the empty state by erasing the physical zone is performed but the reset operation is not completed according to a state of another physical zone in the super block including the physical zone. This is described in more detail with reference to FIGS. 5, 6, and 12 to be described later. The zone information storage 220 may store information on the state of each of the physical zones and a time point at which the state of each of the physical zones is switched. In an embodiment, the zone information storage 220 may store information on a time point at which the physical zone is switched to the full state.

In addition, the zone information storage 220 may store the log of the data stored for each physical zone. The log of the data may be based on a property such as a type and a temperature of the data, and may be generated by the file system 420 of the host 400. Data having the same log may be stored in the same physical zone.

The zone information storage 220 may control to store state information for each zone and the log of the stored data in a buffer memory (not shown) existing inside or outside the memory controller 200 or a portion of the memory device 100. The zone information storage 220 may provide the stored information for the physical zones to select a victim physical zone when the garbage collection is performed.

Figure 5:
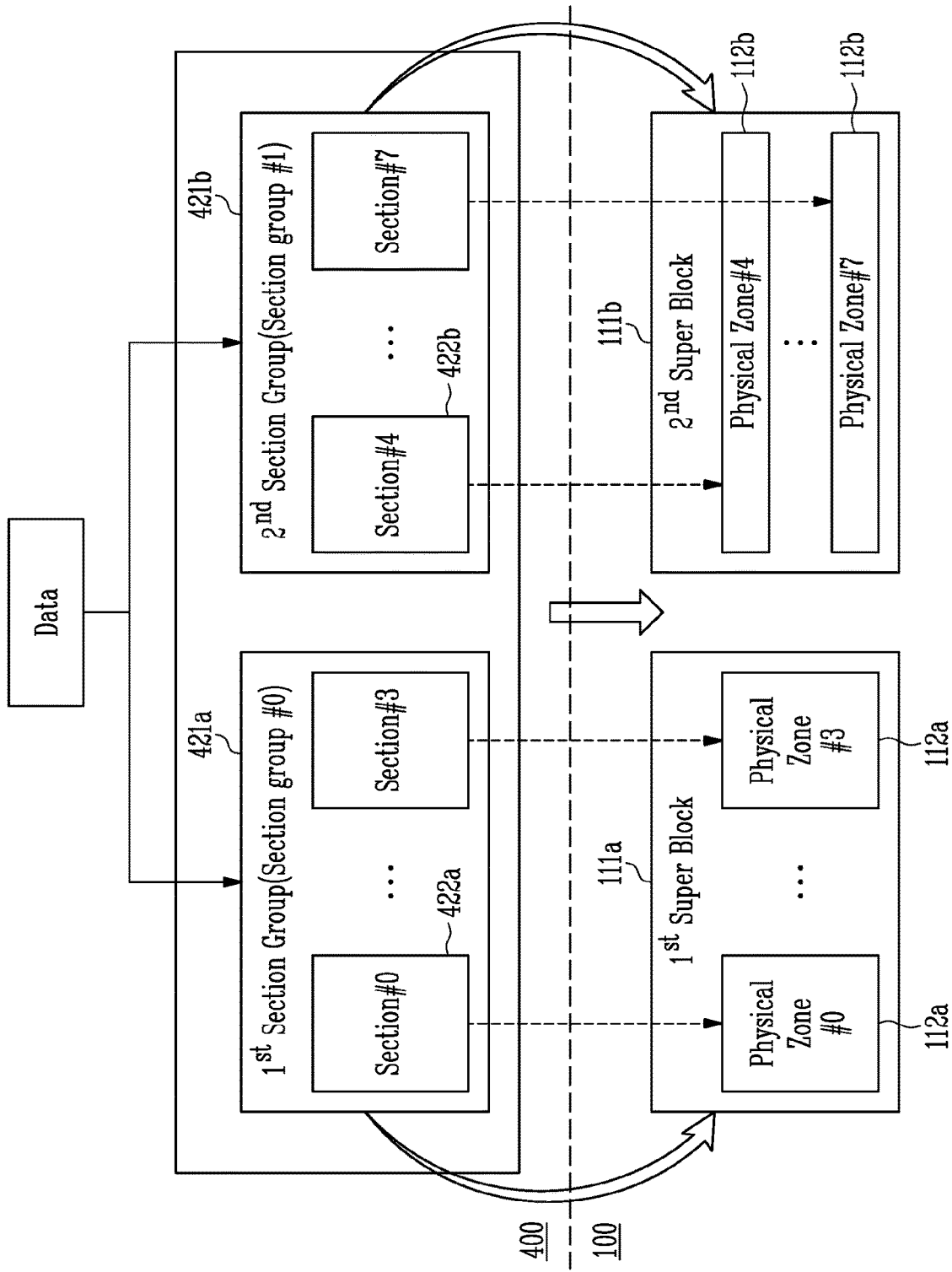
FIG. 5 is a diagram illustrating a super block allocation process of a storage device according to an embodiment of the present disclosure.

FIG. 5 is a diagram illustrating a super block allocation process of a storage device according to an embodiment of the present disclosure.

Referring to FIGS. 1 and 5, the file system 420 of the host 400 generates the log based on the property of data with respect to the data requested to be written by the application 410, classifies the data based on the log, and determines a section group including the section to be allocated to the data. According to various criteria, the data may be divided into first type data to which a first section 422a of a first section group 421a is allocated and second type data to which a second section 422b of a second section group 421b is allocated. The data to which the first section 422a in the first section group 421a is allocated by the file system may be stored in a first physical zone 112a in a first super block 111a of the memory device 100 and the data to which the second section 422b in the second section group 421b is allocated may be stored in a second physical zone 112b in a second super block 111b of the memory device 100, under the control of the memory controller 200. The first section group 421a may correspond to the first super block 111a, and thus the first section 422a corresponds to the first physical zone 112a. A characteristic of the first section 422a to which a new section may be allocated regardless of a section order in the section group corresponds to a characteristic of the first physical zone 112a managed for each memory die, and both of the first section 422a and the first physical zone 112a have the same characteristics that a reset or erase operation is possible in one section or zone unit. In addition, a characteristic of the second section 422b allocating a new section according to the section order in the section group corresponds to a characteristic of the second physical zone 112b formed over the plurality of memory dies, and both of the second section 422b and the second physical zone 112b have the same characteristics that the reset or erase operation is impossible in one section or zone unit, and the reset or erase operation is performed in a section group or super block unit after both of the second section group 421b and the second super block 111b to which each belongs are in a state in which both of the second section group 421b and the second super block 111b may be reset or erased. A shape of the first physical zone 112a and the second physical zone 112b is described in more detail with reference to FIG. 6, and the allocation and reset of the first section 422a and the second section 422b are described in more detail with reference to FIGS. 7 to 11.

The first sections 422a in the first section group 421a may be allocated regardless of the section order, and the memory controller 200 may allocate the first physical zone 112a formed as an area in one memory die in response to a request for allocating a physical zone in which data to which the section is allocated is to be stored from the host 400. The second sections 422b in the second section group 422b may be allocated according to the section order, and the memory controller 200 may allocate the second physical zone 112b formed as an area including some of the memory blocks in the plurality of memory dies in response to the request for allocating the physical zone in which the data to which the section is allocated is to be stored from the host 400. When the memory controller 200 replies with information that an additional allocable physical zone does not exist in a currently used super block with respect to the physical zone allocation request of the host 400, the file system 420 may allocate a new section group, and then allocate a section in the new section group. In response to this, the memory controller 200 may allocate a new super block and a new physical zone included therein, and then store data to which the new section is allocated. Alternatively, the file system 420 may allocate the new section group and the section included therein by itself without receiving reply information for the super block and the physical zone from the memory controller 200.

Figure 6:
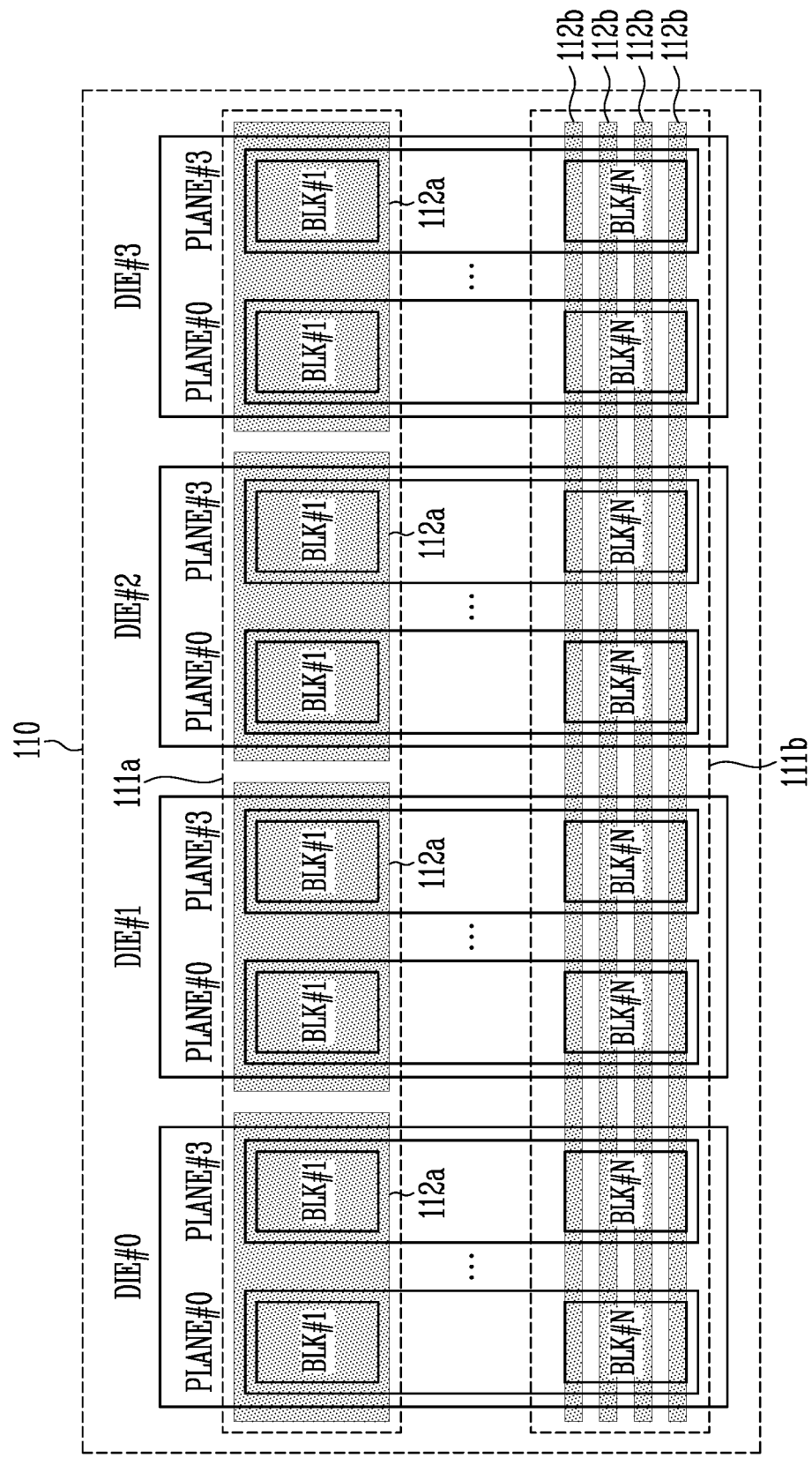
FIG. 6 is a diagram illustrating super block management of a storage device according to an embodiment of the present disclosure.

FIG. 6 is a diagram illustrating super block management of a storage device according to an embodiment of the present disclosure.

Referring to FIGS. 1, 4, and 6, the memory cell array 110 may include a plurality of memory dies, for example, four memory dies DIE #0 to DIE #3. In addition, each memory die may include a plurality of planes each including a plurality of memory blocks, for example, four planes PLANE #0 to PLANE #3. The memory controller 200 may control the memory cell array 110 of the memory device 100 by dividing the memory cell array 110 into a plurality of super blocks. The super blocks may include two or more memory blocks included in the memory cell array 110. The super blocks may include a plurality of physical zones. The super block may be formed over the plurality of memory dies, and as shown in FIG. 6, the super block may be formed over all memory dies. The super block may be classified into the first super block 111a and the second super block 111b according to a type of the physical zone included therein. In the storage device according to an embodiment of the present disclosure, the super block, which is a unit by which the memory controller 200 controls the memory device 100, may include only the first super blocks 111a including the first physical zones 112a, may include only the second super blocks 111b including the second physical zones 112b, or may include both of the first super block and the second super block.

In a case of the first physical zone 112a included in the first super block 111a, one or more blocks may be included in one memory die. For example, as shown in FIG. 6, a zone including one memory block included in the planes 0 to 3 for each memory die may be designated as one zone, and thus the first super block 111a may include four first physical zones 112a formed one by one for each memory die.

The second physical zone 112b included in the second super block 111b may include a portion of each of the blocks included in different memory dies. For example, as shown in FIG. 6, the second physical zone 112b may be formed over the entire four memory dies DIE #0 to DIE #3, and may include only a portion of each of the memory blocks included in each plane. For example, as shown in FIG. 6, only ¼ of pages of each of the memory blocks included in each plane may be included. Accordingly, the second super block 111b may include four second physical zones 112b formed over all memory dies and formed to include only a partial page of each of the memory block.

In an embodiment, sizes of the first super block 111a and the second super block 111b may be the same. That is, the first super block 111a and the second super block 111b may include the same number of memory blocks. In addition, sizes of the first physical zone 112a and the second physical zone 112b may be the same. That is, the number of pages included in the first physical zone 112a and the second physical zone 112b may be the same. The first physical zone 112a may be formed in one memory die. In contrast, the second physical zone 112b may be formed over the plurality of memory dies. Accordingly, the second physical zone 112b may be operated in a die interleaving method. In particular, when the second physical zone 112b is formed over all memory dies as shown in FIG. 6, the second physical zone 112b may be operated in a full-die interleaving method. However, different second physical zones 112b may not be allocated and programmed simultaneously. In addition, since the second physical zone includes only a portion of each of the memory blocks, when a specific physical zone is to be erased, the specific physical zone may not be immediately erased, and when the entire page of each of the memory blocks partially included in a corresponding physical zone may be erased, that is, when the entire physical zone of the super block in which the corresponding physical zone is included may be erased, the corresponding physical zone may be erased. Therefore, the second physical zone may have an advantage that the second physical zone may be operated in the interleaving method of a memory die unit and the second physical zone may be unsuitable for storing data of which an input/output frequency is high in consideration of a limitation during program or erasure. Accordingly, both of the first super block and the second super block are used to store data having a relatively small size or a high input/output frequency in the first physical zone in the first super block and store data having a relatively large size or a low input/output frequency in the second physical zone in the second super block, thereby improving performance of the storage device.

As described above, the physical zones included in the super block, such as the first physical zone and the second physical zone, may be divided into the full state, the empty state, and the active state, and the second physical zone may further have a ready-to-reset state. The reset operation on the physical zone may mean an operation for creating an empty zone by erasing the physical zone. The erasure may be performed in a memory block unit, and as shown in FIG. 6, the second physical zone 112b includes only a portion of each of the plurality of memory blocks. On the other hand, the first physical zone 112a may include all of one or more memory blocks. Therefore, when a specific first physical zone 112a is to be reset, a corresponding physical zone may be immediately erased. On the other hand, in a case where a specific second physical zone 112b is to be reset, when all pages of each of the memory blocks partially included in the corresponding physical zone may be erased, that is, when the entire physical zone of the super block in which the corresponding physical zone is included may be erased, the corresponding physical zone may be erased. Therefore, when the reset operation is performed on the second physical zone 112b, the corresponding physical zone may not be immediately erased, and may be switched to the ready-to-reset state. When all second physical zones 112b in the second super block 111b in which the second physical zone 112b is included are switched to the ready-to-reset state, all second physical zones 112b in the corresponding super block may be erased at once, and may be switched to the empty state.

Figure 7:
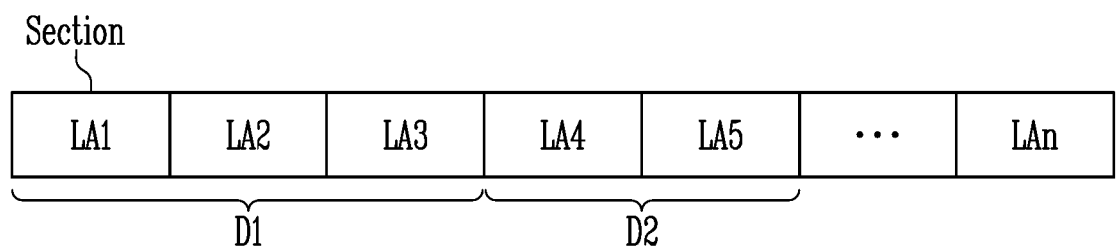
FIG. 7 is a diagram illustrating a structure of a section allocated by a file system according to an embodiment of the present disclosure.

FIG. 7 is a diagram illustrating a structure of the section allocated by the file system according to an embodiment of the present disclosure.

Referring to FIG. 7, the section may include a plurality of LAs. The LAs included in one section may be successive addresses or non-successive addresses. Allocation of the section for data may mean that the LA in the section is allocated. Information on the addresses included in each section may be included in the memory in the host or the memory in the storage device. The LA may be sequentially allocated according to a size of data for which writing is requested. For example, when a write request for data D1 and D2 of a specific size exists, and the sections of FIG. 7 are allocated to both of the data D1 and D2, LAs of LA1 to LA3 may be allocated to D1, and LAs of LA4 and LA5 may be allocated to D2.

Figure 8:
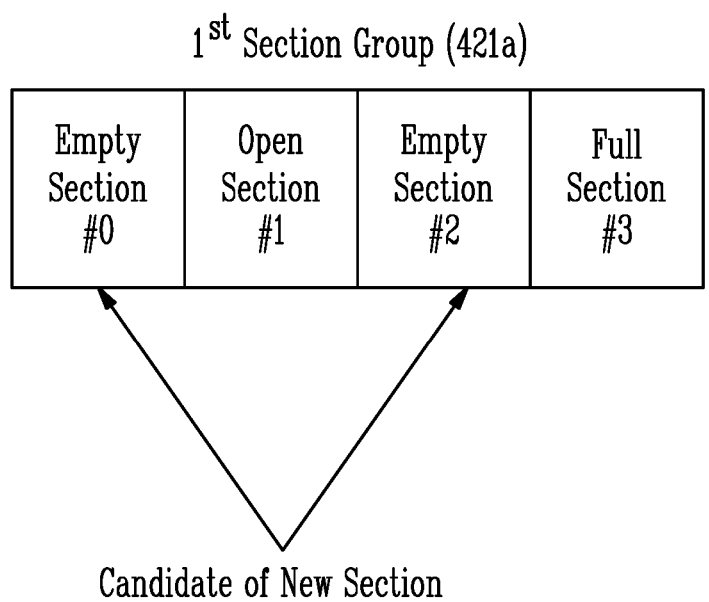
FIG. 8 is a diagram illustrating a process of allocating a new section of a first section group by the file system according to an embodiment of the present disclosure.

FIG. 8 is a diagram illustrating a process of allocating the new section of the first section group by the file system according to an embodiment of the present disclosure.

Referring to FIG. 8, a section group to which a new section may be allocated regardless of the section order in the section group may be defined as a first section group 421a. At this time, LAs included in the sections in the section group may be successive with each other, and as the number of section in the section group increases, the LA may increase. Therefore, the section order may mean a section number order in the section group, which may mean an order in a direction in which the LA increases. Alternatively, the LAs included in the sections in the section group may not be successive with each other. In this case, the section order may be determined based on information on a section stored in a separate memory and LAs included for each section group. In a case of the first section group 421a, since the section is allocated and the LA may be allocated regardless of the section order, a third section Section #3 may be allocated first and all LAs in the third section may be assigned. Therefore, after a full section, a first section Section #1 may be allocated and the LA for new data may be allocated. When all LAs of the first section, which are open sections, are assigned to the data and the first section becomes the full section, the file system 420 may allocate one of a 0-th section Section #0 or a second sections Section #2 which is an empty section as a new section and assign an LA included therein to the data.

Figure 9:
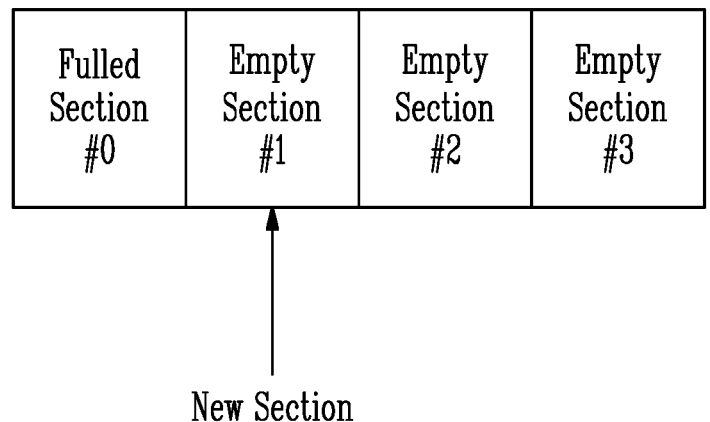
FIGS. 9 and 10 are diagrams illustrating a process of allocating a new section of a second section group by the file system according to an embodiment of the present disclosure.
Figure 10:
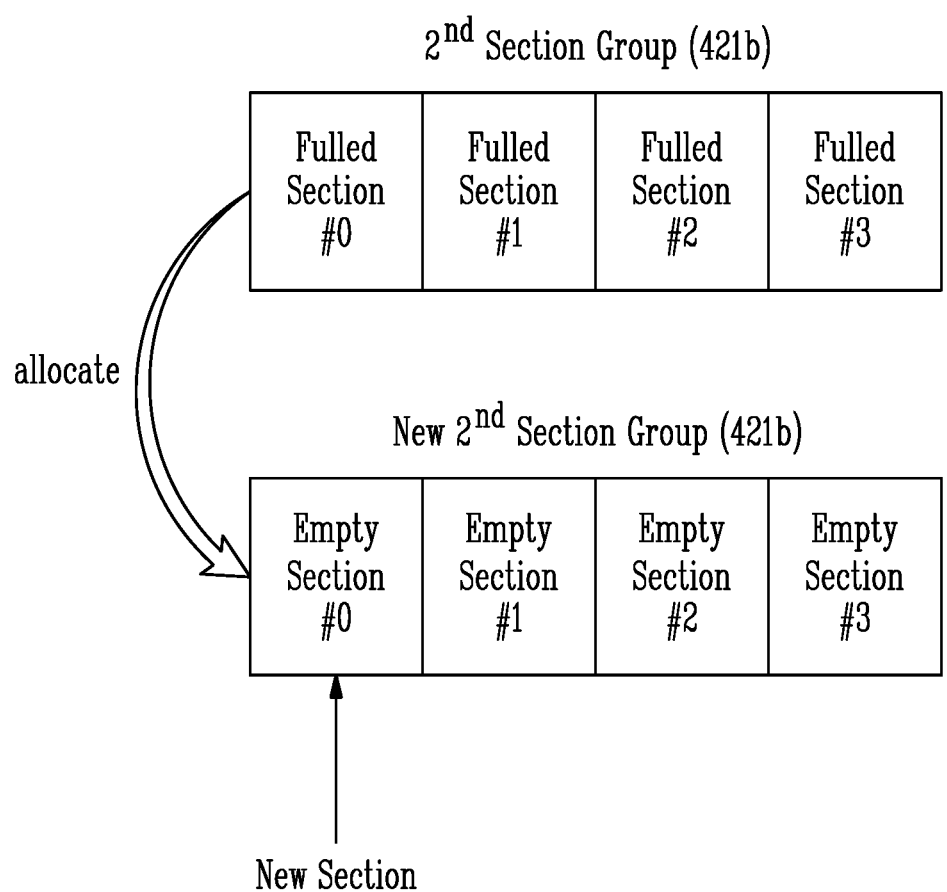

FIGS. 9 and 10 are diagrams illustrating a process of allocating the new section of the second section group by the file system according to an embodiment of the present disclosure.

Referring to FIGS. 9 and 10, a section group to which a new section may be allocated according to the section order in the section group may be defined as a second section group 421b. As shown in FIG. 9, in the second section group, the 0-th section Section #0 may be opened first and an LA included therein may be assigned to the data, when the 0-th section becomes the full section, a first section Section #1 which is a next section may be allocated as a new section, and thus data may be stored. When all sections in the second section group 421b are the full sections as shown in FIG. 10, after the file system 420 allocates the new second section group 421b, the file system 420 may allocate the 0-th section Section #0 which is a first section in the new second section group 421b and assign an LA included therein to the data. At this time, in a case of the second section group 421b, since the section is allocated according to the section order in the section group, and when the third section Section #3 which is a last section is the full section, the empty section may not exist among sections prior thereto. Therefore, in a case of the second section group 421b, the empty section in the section group is required to be found, and when a section of a next section in the second section group 421b does not exist, the file system 420 allocates a new second section group 421b.

Figure 11:
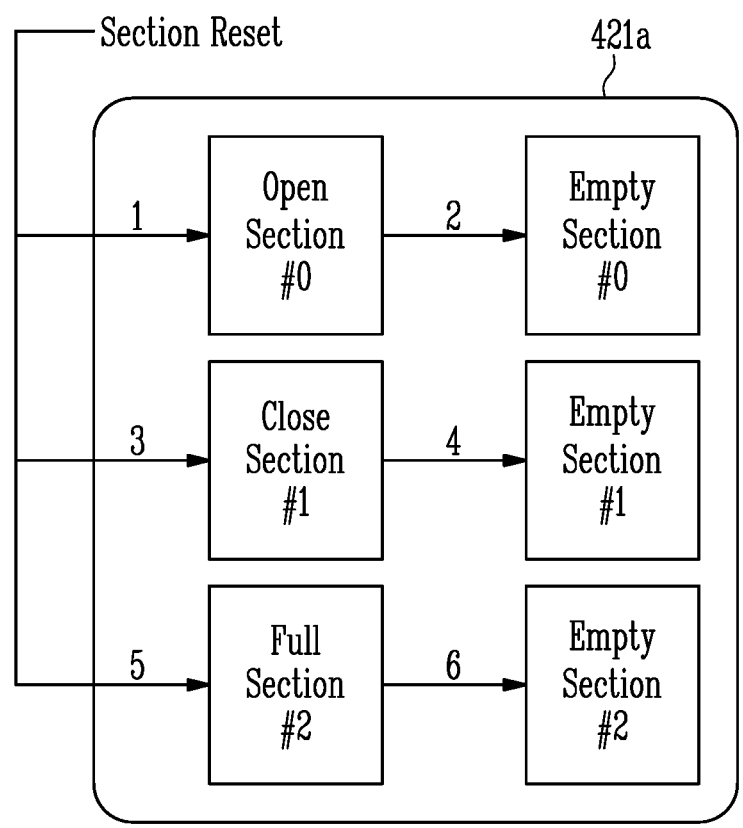
FIG. 11 is a diagram illustrating a reset process of the first section group by the file system according to an embodiment of the present disclosure.

FIG. 11 is a diagram illustrating a reset process of the first section group by the file system according to an embodiment of the present disclosure.

Referring to FIG. 11, in the first section group 421a, 1) when resetting the 0-th section Section #0, 2) when all data corresponding to the LAs in the 0-th section are discarded, the 0-th section may become the empty section, and thus a reset operation is completed. In addition, 3) when resetting the first section Section #1, 4) when all data corresponding to the LAs in the first section are discarded, the first section may become the empty section, and thus the reset operation may be completed. In addition, 5) when resetting the second section Section #2, 6) when all data corresponding to the LAs in the second section are discarded, the second section may become the empty section, and thus the reset operation may be completed. That is, when the reset operation is performed on one section included in the first section group 421a, data corresponding to the LAs in a corresponding section may be discarded in response thereto, the corresponding section may become the empty section immediately, and thus the reset operation may be completed. At this time, discarding the data corresponding to the LAs in the reset operation on the section may mean releasing a mapping relationship between the LA and the data. The reset operation may be performed when all data corresponding to the LAs in a specific section are invalid, and when valid data exists, the valid data may be mapped to an LA of another section, and data corresponding to the LA may be invalidated, and then the reset operation may be performed. The LAs included in the section of which reset is completed may be re-assigned to new data. The reset operation may be performed by the file system.

Figure 12:
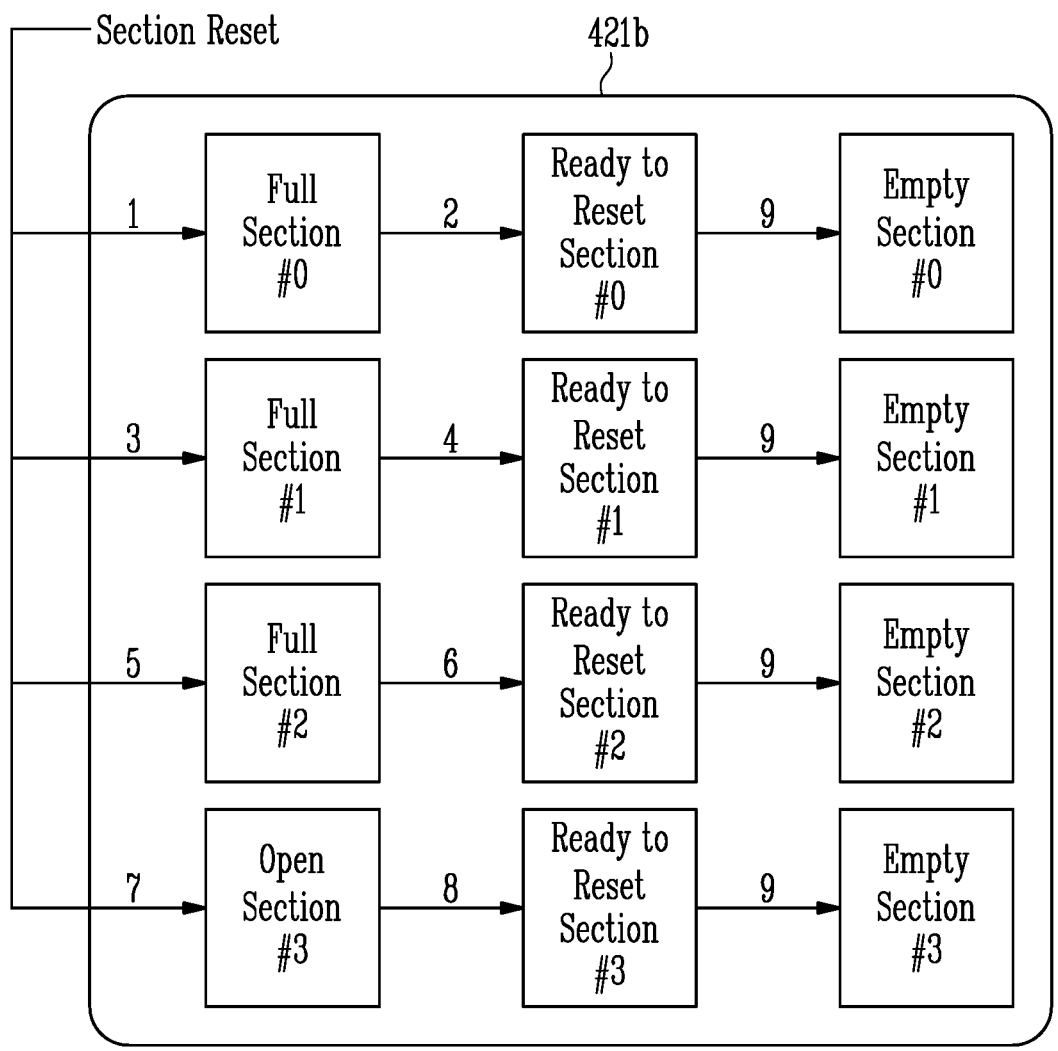
FIG. 12 is a diagram illustrating a reset process of the second section group by the file system according to an embodiment of the present disclosure.

FIG. 12 is a diagram illustrating a reset process of the second section group by the file system according to an embodiment of the present disclosure.

Referring to FIGS. 5 and 12, in the second section group 421b, 1) when resetting the 0-th section Section #0, 2) the data corresponding to the LAs in the 0-th section are not immediately discarded, information indicating that the 0-th section is in the ready-to-reset state (Ready to Reset Section) is stored in a bitmap. In addition, 3) when resetting the first section Section #1, 4) the data corresponding to the LAs in the first section are not immediately discarded, and information indicating that the first section is in the ready-to-reset state (Ready to Reset Section) is stored in the bitmap. In addition, 5) when resetting the second section Section #2, 6) the data corresponding to the LAs in the second section are not immediately discarded, and information indicating that the second section is in the ready-to-reset state (Ready to Reset Section) is stored in the bitmap. In addition, 7) when resetting the third section Section #3, 8) the data corresponding to the LAs in the third section are not immediately discarded, and information indicating that the third section is in the ready-to-reset state (Ready to Reset Section) is stored in the bitmap. 9) Accordingly, when the information indicating that all sections of the second section group 421b is ready to reset is stored in the bitmap, all data corresponding to all LAs in all sections may be discarded, all sections in the second section group 421b may become empty sections at once, and thus the reset operation may be completed. That is, in a case of the second section group 421b, when only some sections are reset, the data may not be immediately discarded and the section may not become the empty section, but all sections in the second section group 421b may become the empty sections simultaneously by discarding the data corresponding to the LAs of all sections included in the second section group 421b after the information indicating that all sections are in the ready-to-reset state is stored. When the reset operation is completed, the information indicating that all sections in the second section group 421b are in the ready-to-reset state may be deleted. At this time, the bitmap storing the information indicating that all sections in the second section group 421b are in the ready-to-reset state may be included in an arbitrary position in the storage device. At this time, discarding the data corresponding to the LAs in the reset operation on the section may mean releasing the mapping relationship between the LA and the data. The reset operation may be performed when all data corresponding to the LAs in a specific section are invalid, and when valid data exists, the valid data may be mapped to an LA of another section, and data corresponding to the LA may be invalidated, and then the reset operation may be performed. The LAs included in the section of which reset is completed may be re-assigned to new data. The reset operation may be performed by the file system. That is, the reset operation of the second section corresponds to the reset operation of the second physical zone 112b in the second super block 111b of FIG. 5. That is, when the reset operation is performed on the second section 422b, the second section is in the ready-to-reset state, and thus the second physical zone 112b corresponding to the second section 422b is not immediately erased, and is switched to the ready-to-reset state. Later, when all second sections 422b in the section group 421b in which the second section 422b is included are switched to the ready-to-reset state, that is, when all second physical zones 112b in the second super block 111b in which the second physical zone 112b is included are switched to the ready-to-reset state, data corresponding to the LAs of all second sections 422b in the section group 421b are discarded, all sections in the second section group 421b become the empty section simultaneously, and all second physical zones 112b in the second super block 111b corresponding thereto are erased, and become the empty state.

Figure 13:
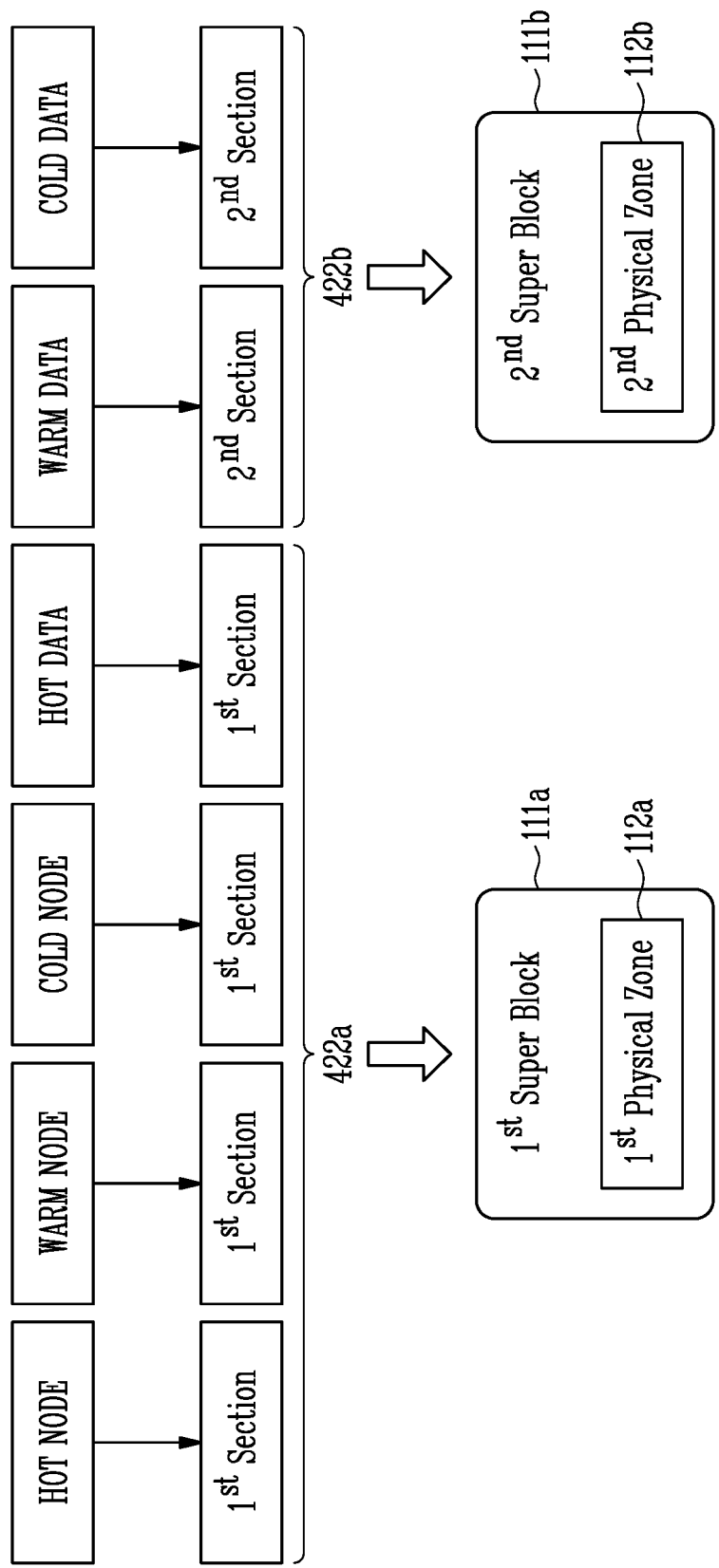
FIG. 13 is a diagram illustrating classification of data according to an embodiment of the present disclosure.

FIG. 13 is a diagram illustrating classification of data according to an embodiment of the present disclosure.

In an embodiment, data requested to be written by the application may be classified into the node or the data according to the type thereof, and may be classified into hot, warm, and cold according to the temperature. Accordingly, the file system 420 may generate the log of a hot node, a warm node, a cold node, hot data, warm data, cold data, or the like with respect to the data according to the property thereof. For example, the hot node may be an inode or direct node block for a directory, and thus the hot node may be data of which an overwrite or update frequency is very high and a probability in which the hot node becomes an object of garbage collection may also be high. The worm node may be an inode or direct node block for a regular file, and thus the worm node may be data of which the overwrite or update frequency is high and a probability in which the worm node becomes the object of the garbage collection is significant. The cold node may be an indirect node block, and thus the cold node may be data in which the overwrite and update frequency is low but a probability in which the cold node becomes the object of the garbage collection is very high.

The hot data may be a directory entry block, quota, or file data of a relatively small size of 64 KB or less, and thus the hot data may be data in which the overwrite or update frequency is high compared to another data and a probability in which the hot data becomes the object of the garbage collection is high. The worm data may be a data block created by a user, and may be file data of a relatively large size of, for example, 64 KB or more. Therefore, the worm data may be data in which the update frequency is relatively high and a probability in which the worm data becomes the object of the garbage collection is relatively low. The cold data may be data moved by cleaning or garbage collection, a data block classified as the cold data by the user, or file data having a specific format (ex, .db, .jpg, or the like), for example, may be multimedia file data. Therefore, the cold data may be data in which the overwrite frequency is low and a probability in which the cold data becomes the object of the garbage collection is relatively low. However, the classification of such data is not limited to such a method, and may be modified in a method having various criteria including a method in FIG. 14 below. In the present specification, the cleaning of the file system may mean releasing the relationship between the LAs in a victim section and data corresponding thereto after allocating another section to valid data corresponding to the LA in the victim section in order to secure the empty section from the host's point of view. The garbage collection of the storage device may mean erasing a corresponding physical zone after moving the valid data among the data stored in the victim physical zone of the memory device to another physical zone. That is, the cleaning and the garbage collection may mean the same operation as a result.

Referring to FIG. 13, the first section 422a included in the first section group may be allocated to the hot node, the warm node, the cold node, and the hot data, and the second section 422b included in the second section group may be allocated to the warm data and the cold data. At this time, the hot node, the warm node, the cold node, and the hot data to which the first section included in the first section group is allocated may be defined as first type data, the warm data and the cold data to which the second section included in the second section group is allocated may be defined as second type data. However, the classification of each data included in the first section group and the second section group is not limited to that shown in FIG. 13, and the data may be variously classified according to setting. Preferably, the first type data may be data having a relatively small size or having a high probability in which the data is updated or overwritten. In addition, the second type data may be data having a relatively large size or having a low possibility in which the data is updated or overwritten. Accordingly, the second type data may be data that is more affected by input/output performance than the first type data. At this time, the data classified as the first type data may be allocated to the sections in one first section group regardless of a specific property thereof. Alternatively, even though the same first type data, when the properties such as the data type (the node, or the data) or the temperature (hot, warm, cold) are different, sections in a plurality of different first section groups may be allocated accordingly. Similarly, the sections within one second section group may be allocated to the data classified as the second type data regardless of the specific property thereof. Alternatively, even though the same second type data, when properties such as the data type (the node, or the data) or the temperature (hot, warm, cold) are different, sections in a plurality of different second section groups may be allocated accordingly. The first type of data to which the first section 422a is allocated may be stored in the first physical zone 112a in the first super block 111a. In addition, the second type of data to which the second section 422b is allocated may be stored in the second physical zone 112b in the second super block 111b.

Figure 14:
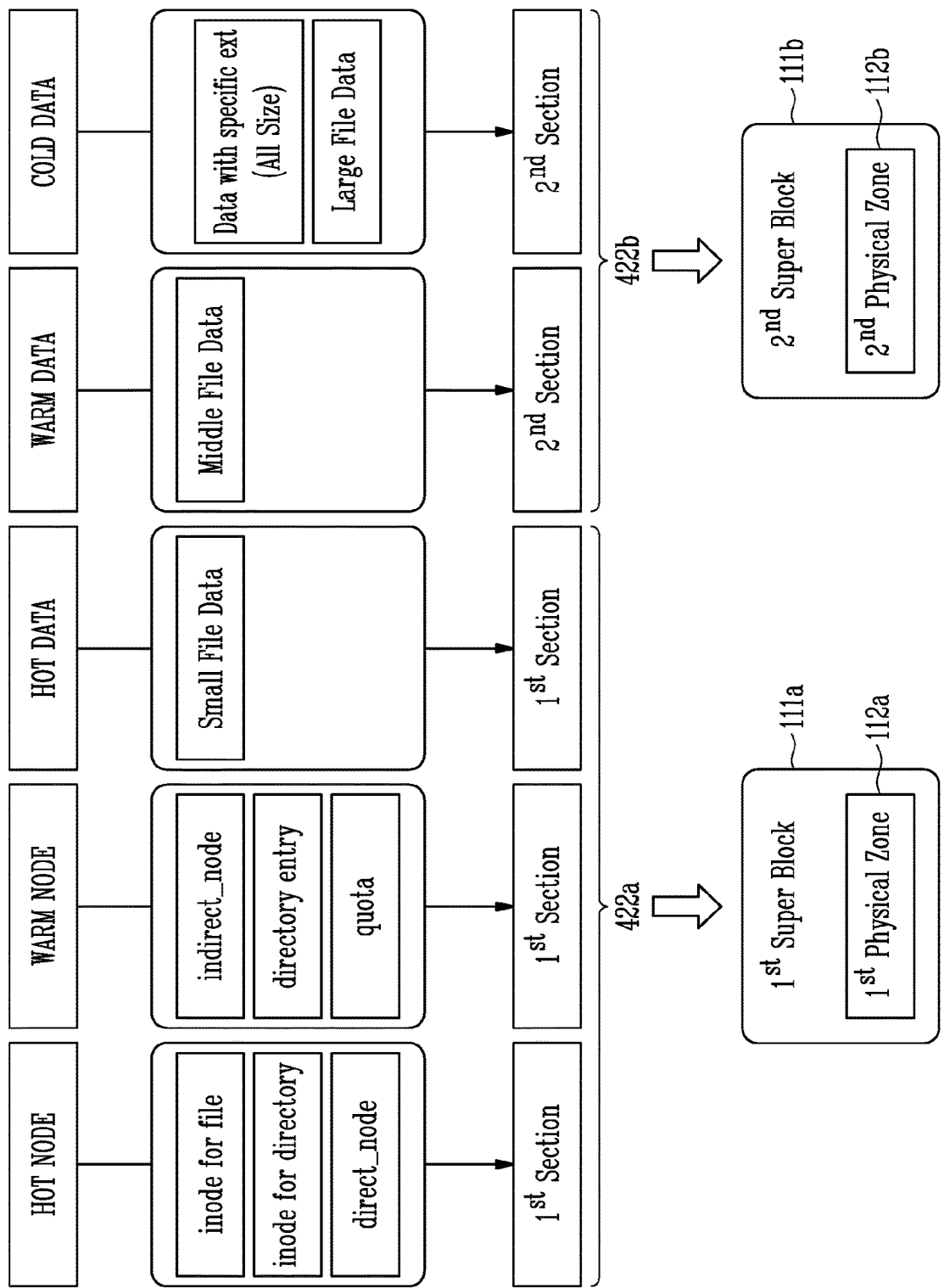
FIG. 14 is a diagram illustrating classification of data according to another embodiment of the present disclosure.

FIG. 14 is a diagram illustrating classification of data according to another embodiment of the present disclosure.

Referring to FIG. 14, data may be classified according to a classification criterion different from that of FIG. 13. In FIG. 14, data is classified into a hot node, a warm node, hot data, warm data, and cold data. The hot node may include an inode for a directory, an inode for a file, and a direct node, and the warm node may include an indirect node, a directory entry block, and a quota. In addition, the hot data may include small-sized file data, the warm data may include medium-sized file data, and the cold data may be large-sized file data or file data of all sizes having a specific format. That is, the classification of the data presented in FIG. 14 may be a reclassification of data of various properties based on the type of the data, the size of the data, a data occurrence frequency, an overwrite frequency, and the like so that dividing and managing the section group and the super blocks are more suitable. Accordingly, the hot node, the warm node, and the hot data classified according thereto may be classified as the first type data, and the sections in the first section group may be allocated to the hot node, the warm node, and the hot data, and the warm data and the cold data may be classified as the second type data, and the sections in the second section group may be allocated to the warm data and the cold data. The first type of data to which the first section 422a is allocated may be stored in the first physical zone 112a in the first super block 111a. In addition, the second type of data to which the second section 422b is allocated may be stored in the second physical zone 112b in the second super block 111b. However, the data classification criterion is not limited to the contents described with reference to FIG. 13 and the contents shown in FIG. 14.

Figure 15:
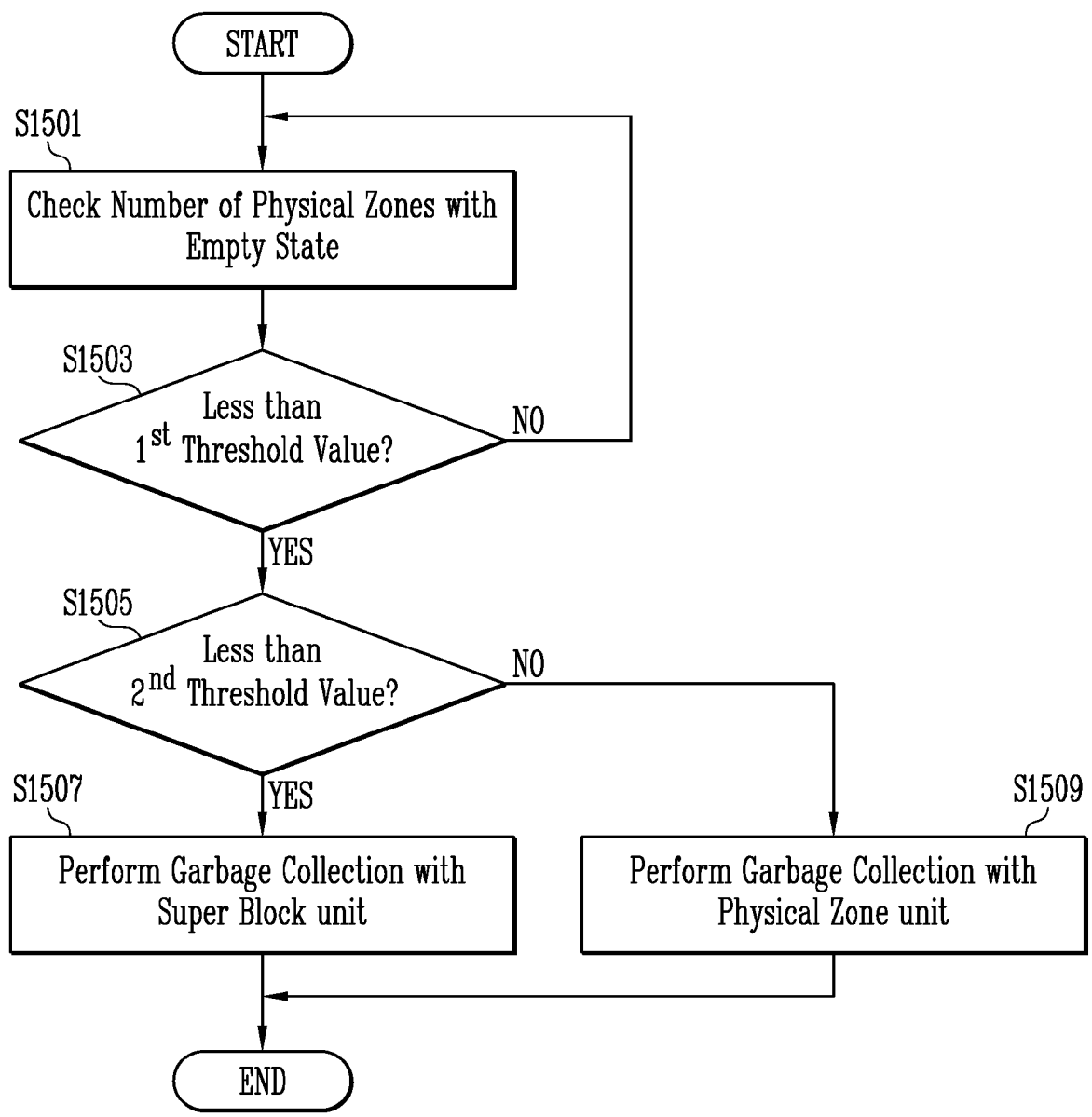
FIG. 15 is a flowchart illustrating garbage collection of a storage device according to an embodiment of the present disclosure.

FIG. 15 is a flowchart illustrating garbage collection of a storage device according to an embodiment of the present disclosure.

Referring to FIG. 15, in operation S1501, the storage device may check the number of physical zones having the empty state among the plurality of physical zones. Whether to perform the garbage collection and a performance method of the garbage collection may be determined based on the checked number of the physical zones of the empty state.

For example, in operation S1503, it may be checked whether the checked number of the physical zones of the empty state is less than a first threshold value. When the number of the physical zones of the empty state is not less than the first threshold value, the garbage collection may not be performed, and the number of the physical zones having the empty state may be repeatedly checked. When the number of the physical zones of the empty state is less than the first threshold value, the garbage collection may be performed. In operation S1505, it may be checked whether the number of the physical zones of the empty state checked in operation S1501 is less than a second threshold value. At this time, the second threshold value may be less than the first threshold value. When the number of the physical zones of the empty state is less than the second threshold value, it may be determined as a state in which securing the physical zone of the empty state is urgent, and in operation S1507, the garbage collection of the super block unit may be performed. When the number of the physical zones of the empty state is not less than the second threshold values, that is, the number of the physical zones of the empty state is between the first threshold value and the second threshold value, it may be determined that securing the physical zone of the empty state is relatively less urgent, and in operation S1509, the garbage collection of the physical zone unit may be performed. A process of performing the garbage collection according to operations S1507 and S1509 is described in more detail with reference to FIGS. 16 to 19.

Figure 16:
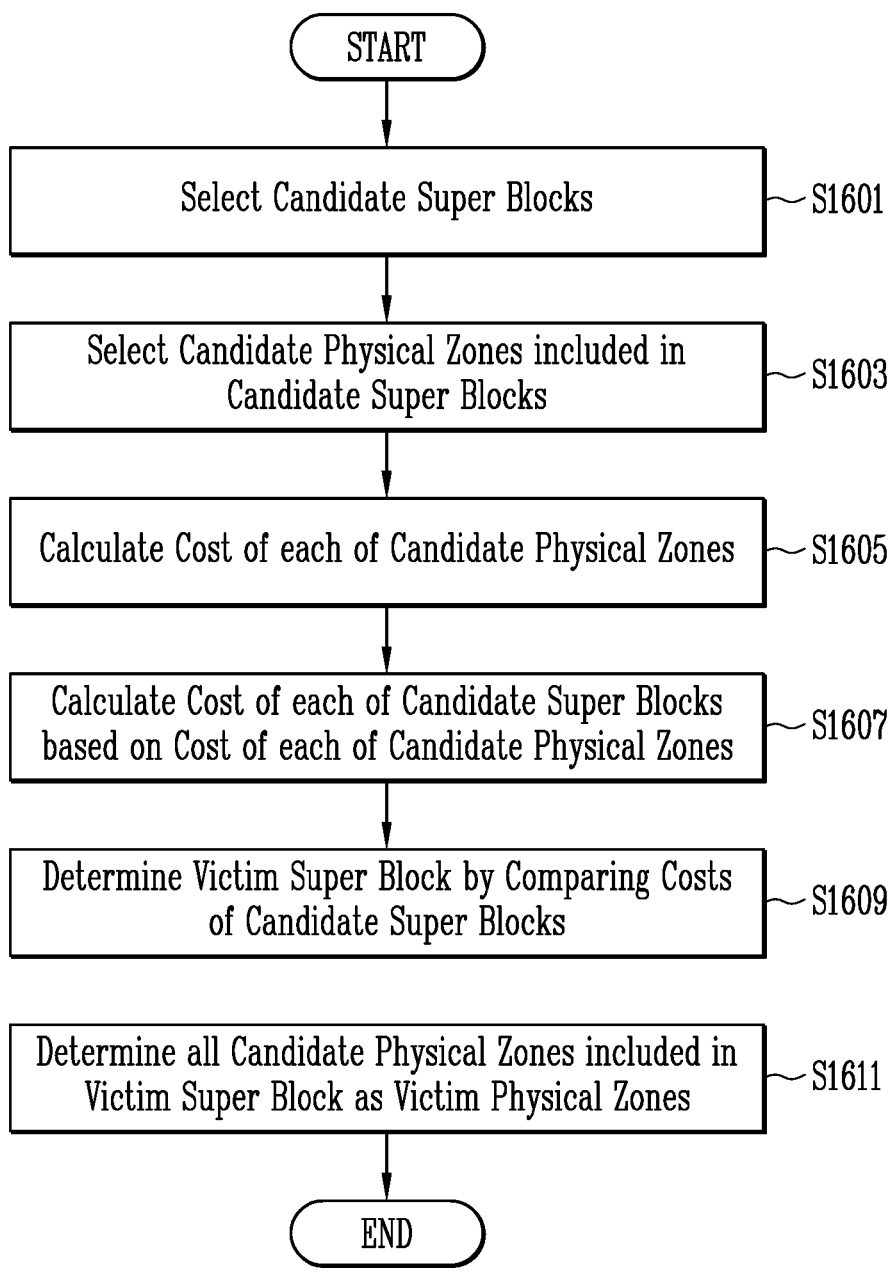
FIG. 16 is a flowchart illustrating a process of selecting a victim physical zone of a storage device according to an embodiment of the present disclosure.

FIG. 16 is a flowchart illustrating a process of selecting a victim physical zone of a storage device according to an embodiment of the present disclosure.

The process of FIG. 16 may be an example of operation S1507 of FIG. 15 in which the garbage collection is performed in the super block unit. Referring to FIGS. 4 and 16, candidate super blocks may be selected in operation S1601. The candidate super blocks may be selected from among the super blocks including only the physical zones of the full state and the physical zones of the ready-to-reset state. At this time, candidate super blocks may be selected based on the information for each of the physical zones stored by the zone information storage 220.

In operation S1603, the candidate physical zones may be selected. The candidate physical zones may be selected from among the physical zones included in the candidate super blocks. Candidate physical zones may be selected from among the physical zones having the full state among the physical zones included in the candidate super blocks. At this time, the candidate physical zones may be selected based on the information on the physical zones stored by the zone information storage 220.

In operation S1605, a cost of each of the candidate physical zones may be calculated. At this time, the cost may be calculated based on the information on each of the candidate physical zones, the information being stored by the zone information storage 220. The cost may be calculated for each of the candidate physical zones according to a predetermined method, and in an embodiment, zones with a high need for garbage collection to be performed can be calculated to have a low cost. In an embodiment, the cost for each of the candidate physical zones may be calculated based on the log of the data stored in each of the candidate physical zones and the time point at which each of the candidate physical zones is switched to the full state. For example, when considering the log of the data stored in the candidate physical zone, it may be determined that a possibility in which data in a corresponding candidate physical zone is invalid data is low as the temperature of the data is cold, as the type of the data is the data rather than the node, and thus the cost may be calculated so that a possibility in which the physical zone is selected as the victim physical zone is increased. In addition, when considering the time point at which the candidate physical zone is switched to the full state, it may be determined that a possibility in which data in a corresponding candidate physical zone is invalid data is low as the time point at which the candidate physical zone is switched to the full state is long, and thus the cost may be calculated so that a possibility in which the physical zone is selected as the victim physical zone is increased.

In operation S1607, the cost of each of the candidate super blocks may be calculated based on the cost of each of the candidate physical zones included in each of the candidate super blocks. For example, after calculating the cost based on the number of the physical zones that are in the ready-to-reset state in each of the candidate super blocks, the cost of each of the candidate super blocks may be calculated by adding the cost calculated in operation S1603 with respect to each of the candidate physical zones included in each of the candidate super blocks. The cost may be calculated so that a possibility in which the physical zone is selected as the victim physical zone is increased as the number of the physical zones that are in the ready-to-reset state in the candidate super blocks increases.

In operation S1609, a victim super block may be determined by comparing the costs of the candidate super blocks. The candidate super block calculated as having the lowest cost may be determined as the victim super block.

In operation S1611, all candidate physical zones included in the victim super block may be determined as the victim physical zone.

Figure 17:
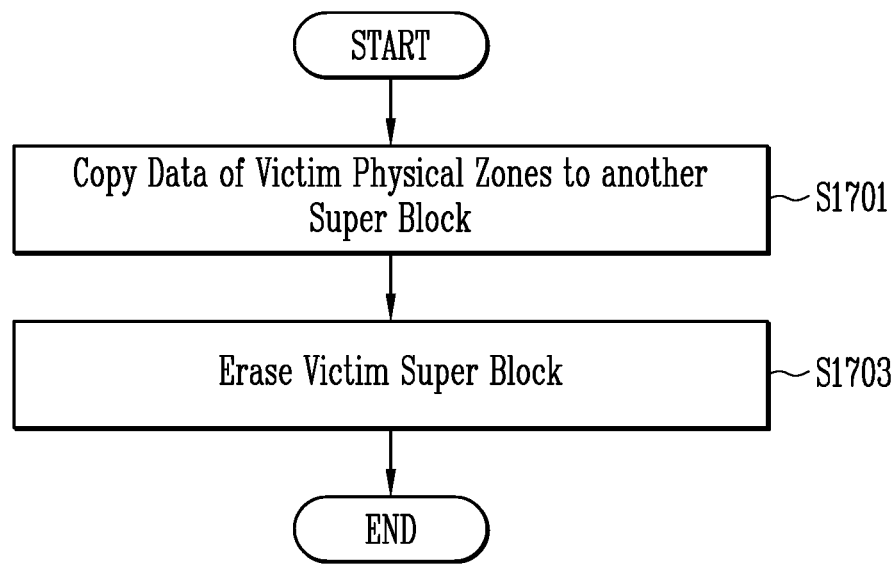
FIG. 17 is a flowchart illustrating a process of performing garbage collection on a victim physical zone in a storage device according to an embodiment of the present disclosure.

FIG. 17 is a flowchart illustrating a process of performing garbage collection on a victim physical zone in a storage device according to an embodiment of the present disclosure.

FIG. 17 may be an example of a process of performing the garbage collection on the victim physical zone determined in FIG. 16. Referring to FIG. 17, in operation S1701, data stored in the victim physical zones may be copied and stored in a super block different from the victim super block. At this time, when the victim super block is a first super block, the copied data may be stored in another first super block. When the victim super block is the second super block, the copied data may be stored in another second super block.

In operation S1703, erasure may be performed on the victim superblock on which data movement is completed. Accordingly, all physical zones included in the victim super block may be switched to the empty state.

Figure 18:
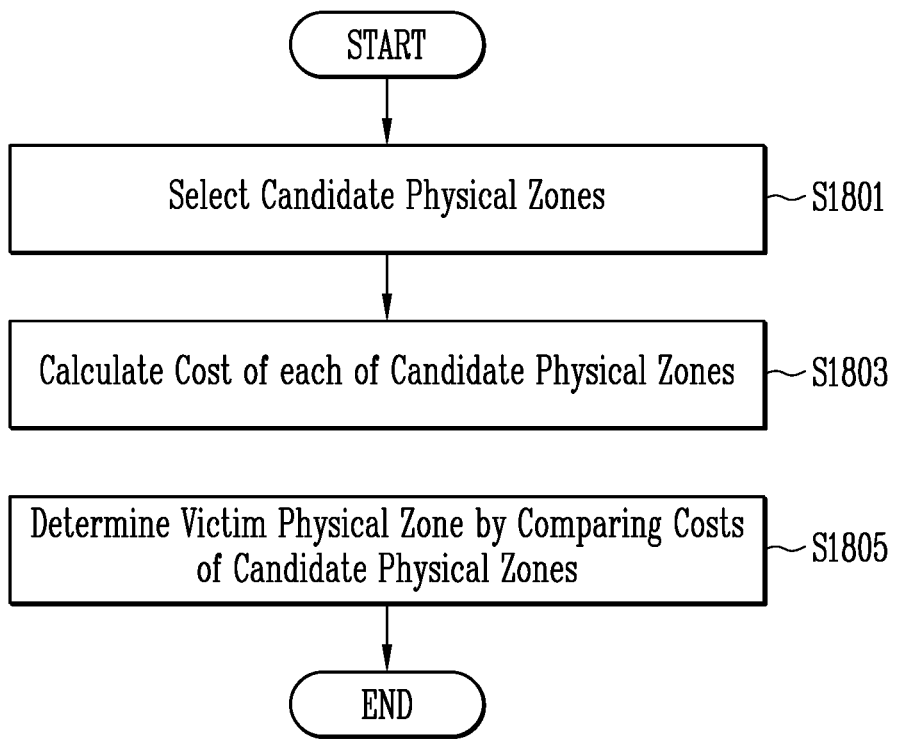
FIG. 18 is a flowchart illustrating a process of selecting a victim physical zone of a storage device according to another embodiment of the present disclosure.

FIG. 18 is a flowchart illustrating a process of selecting a victim physical zone of a storage device, according to another embodiment of the present disclosure.

The process of FIG. 18 may be an example of operation S1509 of FIG. 15 of performing the garbage collection in the physical zone unit. Referring to FIGS. 4 and 18, in operation S1801, the candidate physical zones may be selected. The candidate physical zones may be selected from among the physical zones having the full state.

In operation S1803, the cost of each of the candidate physical zones may be calculated. At this time, the cost may be calculated based on the information for each of the candidate physical zones, the information being stored by the zone information storage 220. In an embodiment, the cost for each of the candidate physical zones may be calculated based on the log of the data stored in the candidate physical zones and the time point at which each of the candidate physical zones is switched to the full state. For example, when considering the log of the data stored in the candidate physical zone, it may be determined that a possibility in which data in a corresponding candidate physical zone is invalid data is low as the temperature of the data is cold, as the type of the data is the data rather than the node, and thus the cost may be calculated so that a possibility in which the physical zone is selected as the victim physical zone is increased. In addition, when considering the time point at which the candidate physical zone is switched to the full state, it may be determined that a possibility in which data in a corresponding candidate physical zone is invalid data is low as the time point at which the candidate physical zone is switched to the full state is long, and thus the cost may be calculated so that a possibility in which the physical zone is selected as the victim physical zone is increased.

In operation S1805, the victim physical zone may be determined by comparing the costs of the candidate physical zones. The candidate physical zone calculated as having the lowest cost may be determined as the victim physical zone.

Figure 19:
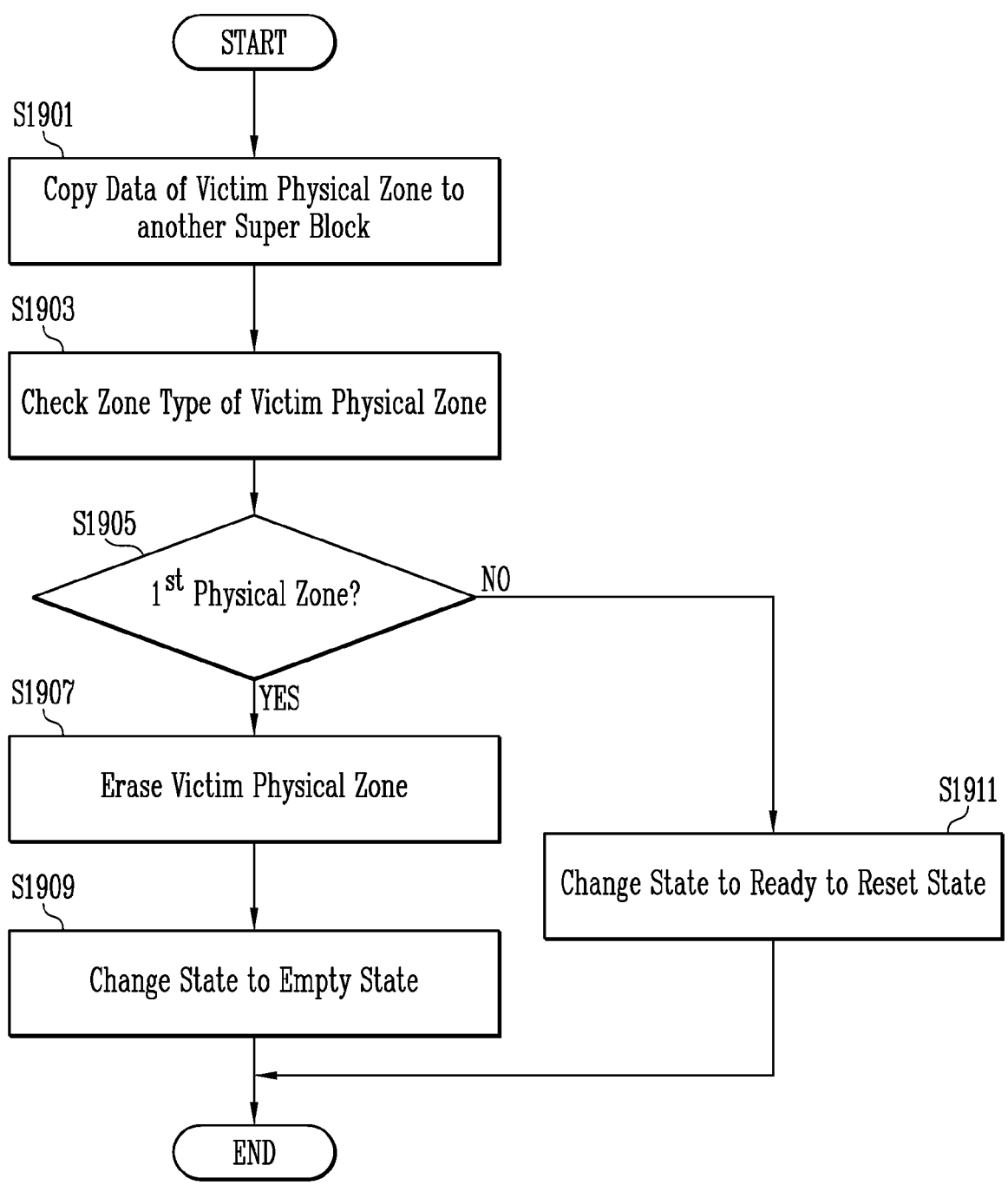
FIG. 19 is a flowchart illustrating a process of performing garbage collection on a victim physical zone in a storage device according to another embodiment of the present disclosure.

FIG. 19 is a flowchart illustrating a process of performing garbage collection on a victim physical zone in a storage device according to another embodiment of the present disclosure.

FIG. 19 may be an example of a process of performing the garbage collection on the victim physical zone determined in FIG. 18. Referring to FIG. 19, in operation S1901, the data stored in the victim physical zones may be copied and stored in a super block different from the victim super block. At this time, when the victim super block is the first super block, the copied data may be stored in another first super block. When the victim super block is the second super block, the copied data may be stored in another second super block.

In operation S1903, a physical zone type of the victim physical zone may be checked. In operation S1905, when it is checked that the victim physical zone is the first physical zone, in operation S1907, the victim physical zone may be erased, and thus a state of the victim physical zone may be changed to the empty state in operation S1909.

In operation S1905, when it is checked that the victim physical zone is not the first physical zone, that is, when it is checked that the victim physical zone is the second physical zone, the victim physical zone may not be immediately erased, and only the state may be changed to the ready-to-reset state in operation S1911. Thereafter, when the entire physical zone in the super block including the victim physical zone is in the ready-to-reset state, the corresponding entire super block may be erased, and thus the state of all physical zones in the corresponding super block may be changed to the empty state.

That is, since a process of the reset operation for erasing the physical zone and causing the physical zone to be in the empty state is different according to a type of the physical zone, the garbage collection may be performed in a method different for each type of the physical zone.

Figure 20:
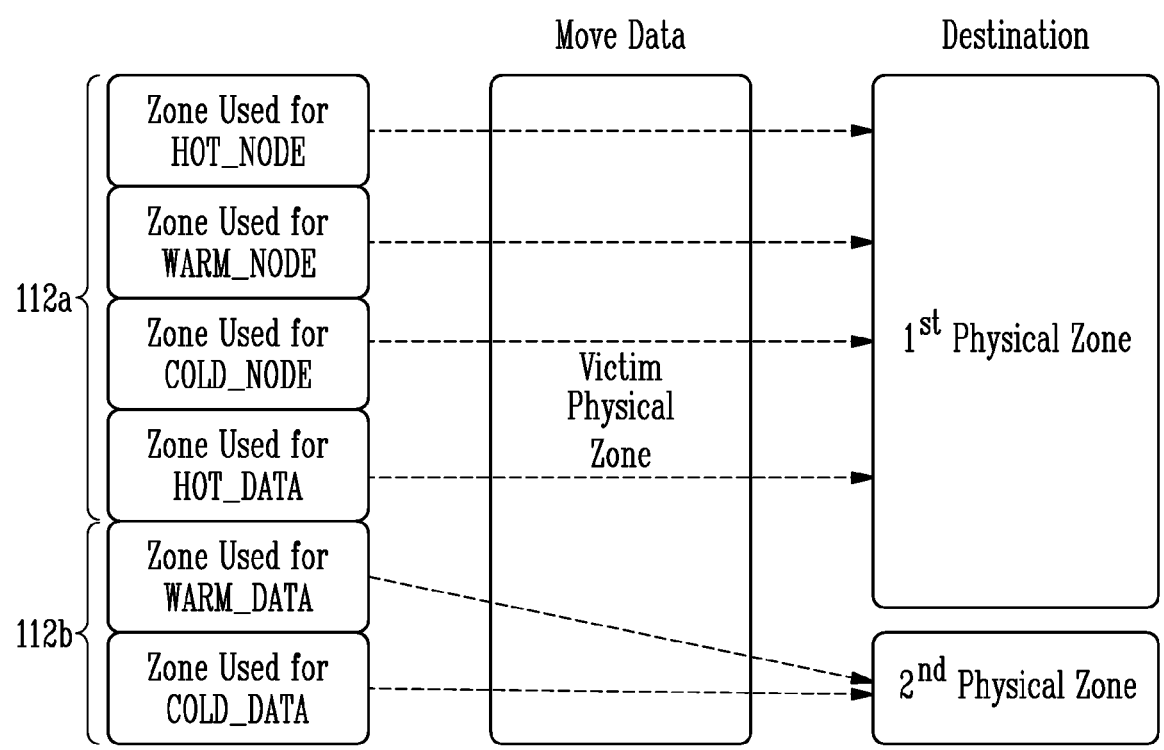
FIG. 20 is a diagram illustrating a process of copying data in a victim physical zone when garbage collection is performed according to an embodiment of the present disclosure.

FIG. 20 is a diagram illustrating a process of copying data in a victim physical zone when garbage collection is performed according to an embodiment of the present disclosure.

Referring to FIG. 20, when the data stored in the victim physical zone is copied and stored in a new super block as in operations S1701 and S1901 of FIG. 17, a determination of the new super block may consider a type of the super block including the victim physical zone. That is, the log of the data stored in the victim physical zone may be considered. For example, the data classified as the first type data such as the hot node, the warm node, the cold node, and the hot data of FIG. 20 and stored in the first physical zone in the first super block moves to the first physical zone in another first super block when a corresponding physical zone is determined as the victim physical zone. When the first physical zone to be allocated does not exist in the first super block, after allocating a new first super block, any first physical zone included the new first super block may be allocated as a physical zone in which the data stored in the victim physical zone is to be newly stored. In addition, the data classified as the second type data such as the warm data and the cold data of FIG. 20 and stored in the second physical zone in the second super block moves to the second physical zone in another second super block when the corresponding physical zone is determined as the victim physical zone. When the second physical zone to be allocated does not exist in the second super block, after allocating a new second super block, a first second physical zone included the new second super block may be allocated as a physical zone in which the data stored in the victim physical zone is to be newly stored.

Figure 21:
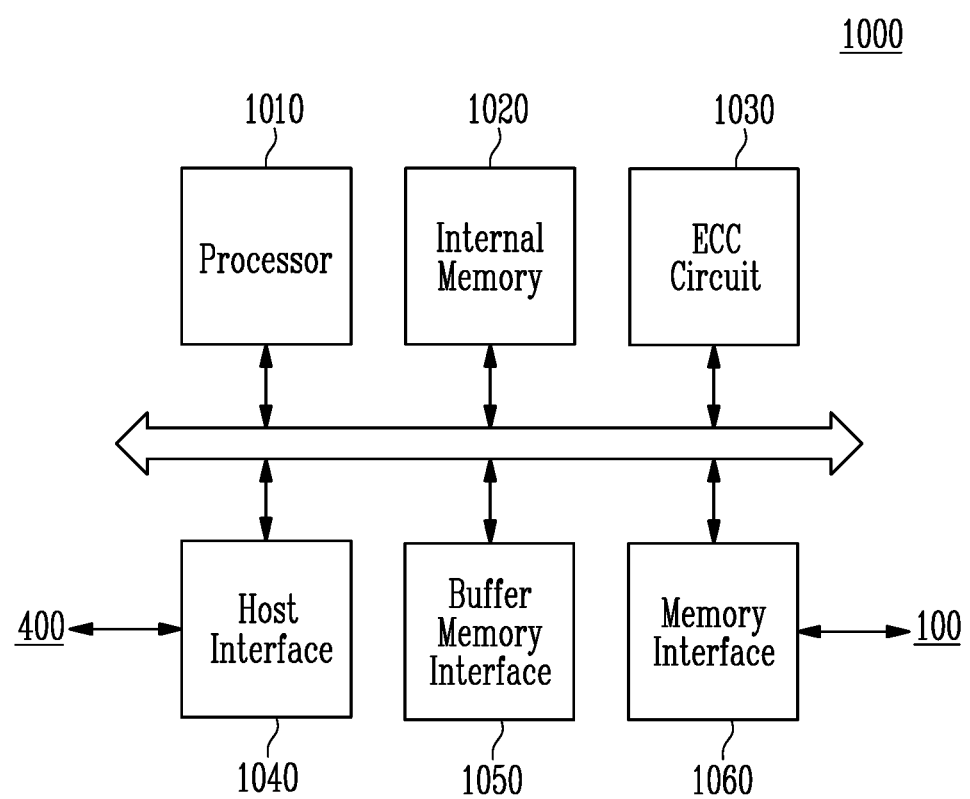
FIG. 21 is a diagram illustrating a memory controller of FIG. 1 according to another embodiment of the present disclosure.

FIG. 21 is a diagram illustrating the memory controller of FIG. 1 according to another embodiment of the present disclosure.

Referring to FIG. 21, the memory controller 1000 may include a processor 1010, an internal memory 1020, an error correction code circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). In addition, the processor 1010 may allocate the super block in the memory device in which the data received from the host is to be stored and the physical zone included therein, in response to the physical zone allocation request from the host 400, and manage the allocated super block and the physical zone. In addition, the processor 1010 may perform garbage collection based on information for each of the physical zones.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM). The internal memory 1020 may store the information for each of the physical zones allocated by the processor. For example, information for a log of data stored in each of the physical zones, state of each of the physical zones, and the like may be stored.

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an embodiment, an error correction block may be provided as a component of the memory controller 1000.

The host interface 1040 may exchange a command, an address, and data between the memory controller 1000 and the host 400. For example, the host interface 1040 may receive a request, an address, and data from the host 400, and may output data read from the memory device 100 to the host 400. The host interface 1040 may communicate with the host 400 using various protocols.

The buffer memory interface 1050 may transmit data between the processor 1010 and the buffer memory. By the processor 1010, the buffer memory interface 1050 may use the buffer memory as a read buffer, a write buffer, a map buffer, and the like. When the buffer memory is included in the memory controller 1000, the buffer memory interface 1050 may be omitted.

The memory interface 1060 may exchange the command, the address, and the data between the memory controller 1000 and the memory device 100. For example, the memory interface 1060 may transmit the command, the address, the data, and the like to the memory device 100 and may receive the data and the like from the memory device 100 through a channel. The memory interface 1060 may transmit and receive the command, the address, and the data to and from the memory device 100 based on the super block and the physical zone allocated and managed by the processor 1010. In addition, when performing the garbage collection, the data in the physical zone selected as the victim physical zone may be moved to a super block different from the super block including the victim physical zone, and an erase operation may be performed on the victim physical zone, or a state of the victim physical zone may be changed, and information on the changed state may be provided to the internal memory 1020.

Figure 22:
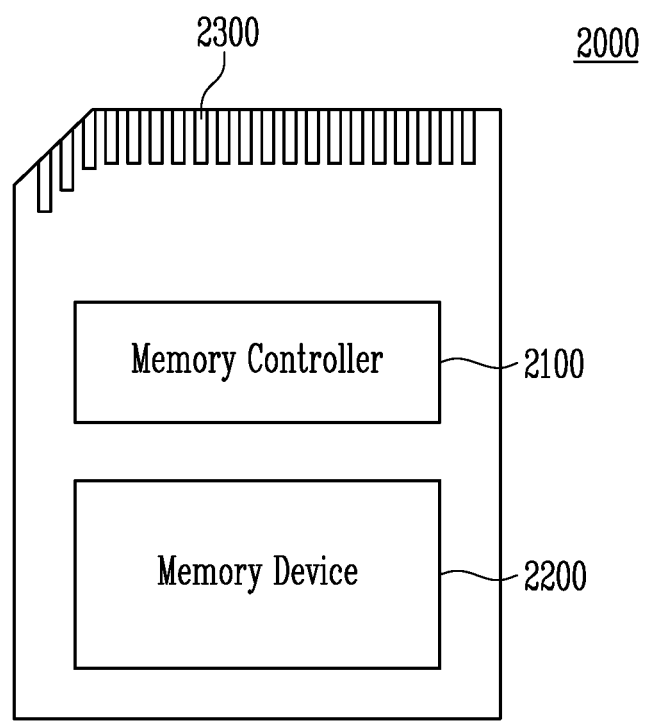
FIG. 22 is a block diagram illustrating a memory card system to which a storage device according to an embodiment of the present disclosure is applied.

FIG. 22 is a block diagram illustrating a memory card system to which a storage device according to an embodiment of the present disclosure is applied.

Referring to FIG. 22, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1. For example, the memory controller 2100 may allocate a physical zone and a super block including the same in the memory device 2200 to control the memory device 2200 in units of the physical zone and the super block.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards. For example, the connector 2300 may be defined by at least one of the various communication standards described above.

For example, the memory device 2200 may be configured of various nonvolatile memory elements.

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 23:
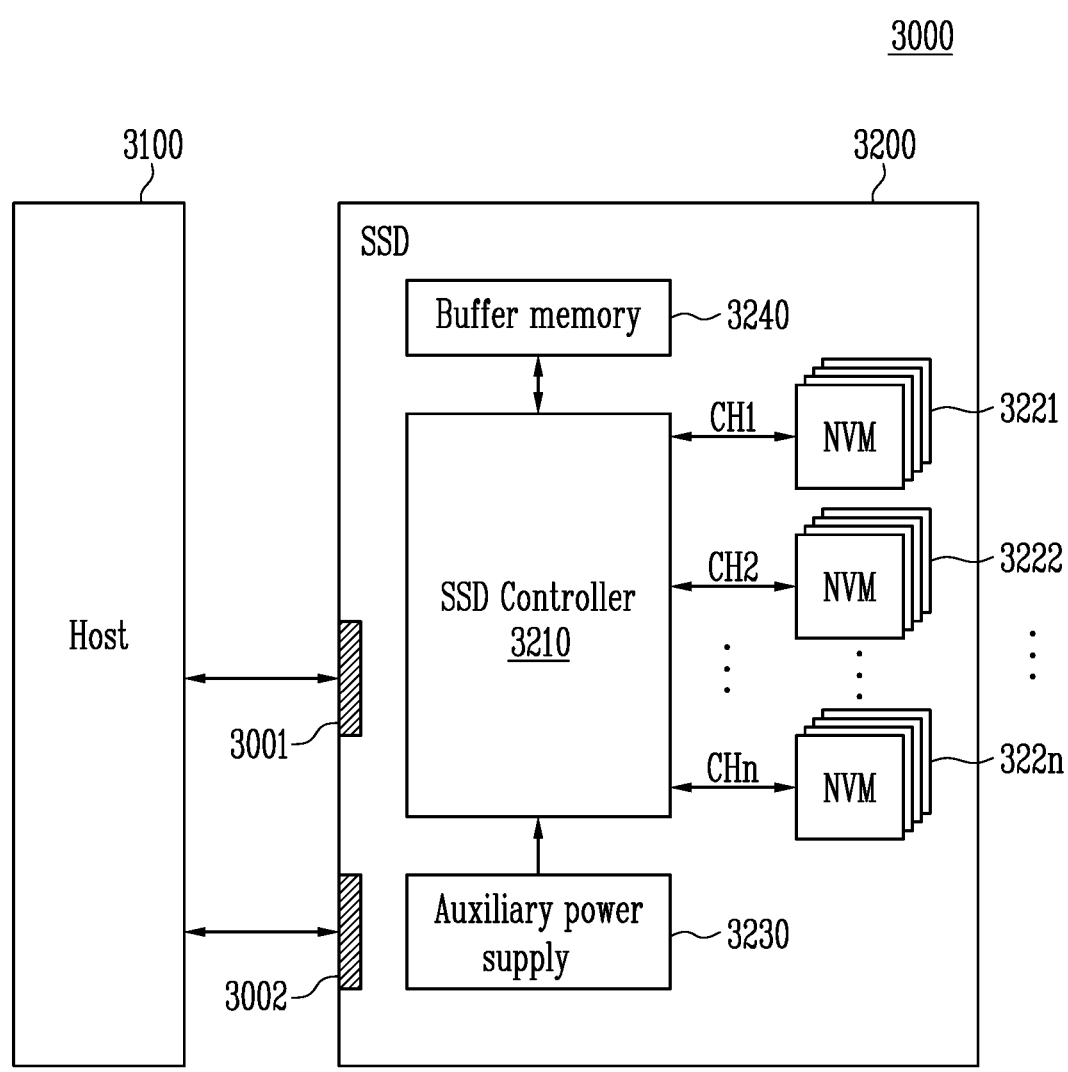
FIG. 23 is a block diagram illustrating a solid state drive (SSD) system to which a storage device according to an embodiment of the present disclosure is applied.

FIG. 23 is a block diagram illustrating a solid state drive (SSD) system to which a storage device according to an embodiment of the present disclosure is applied.

Referring to FIG. 23, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. The SSD controller 3210 may control the plurality of flash memories through a plurality of channels CH1 to CHn. One or more memory dies may be connected to each channel. For example, the signal may be signals based on an interface between the host 3100 and the SSD 3200. For example, the signal may be a signal defined by at least one of various communication standards or interfaces. The SSD controller 3210 may perform the garbage collection according to a garbage collection performance request received from the host 3100, or may perform the garbage collection independently.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory or a nonvolatile memory.

Figure 24:
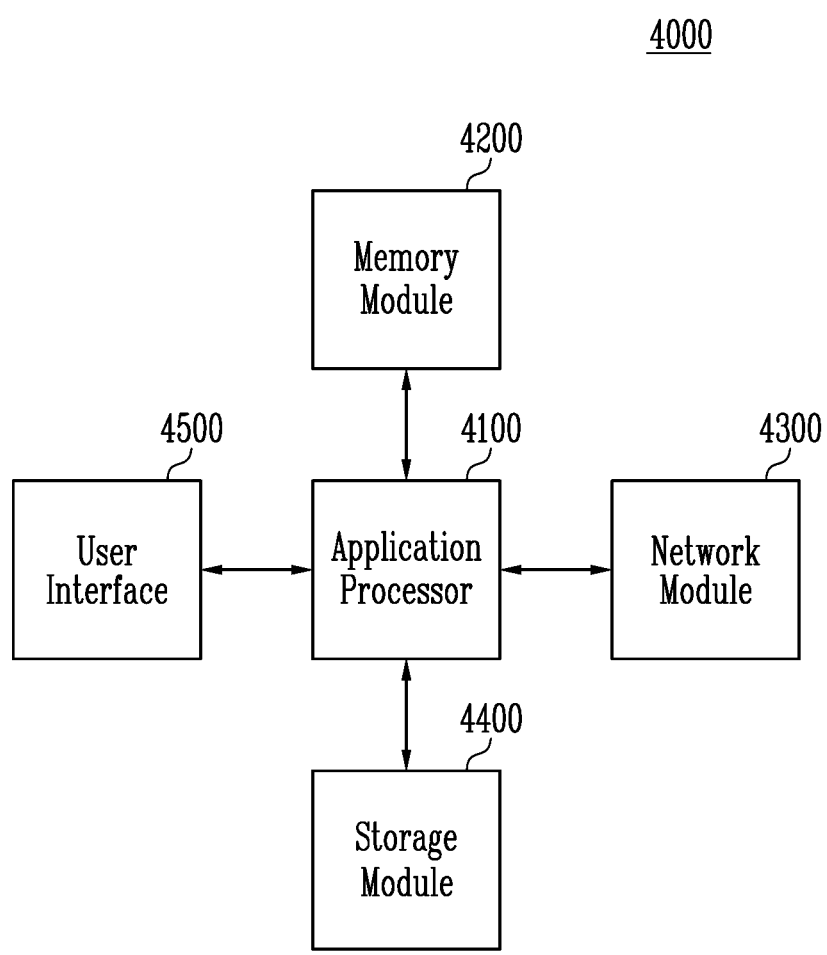
FIG. 24 is a block diagram illustrating a user system to which a storage device according to an embodiment of the present disclosure is applied.

FIG. 24 is a block diagram illustrating a user system to which a storage device according to an embodiment of the present disclosure is applied.

Referring to FIG. 24, the user system 4000 includes an application processor 4100, a memory module 4200, a network module 4300, a storage module 4400, and a user interface 4500.

The application processor 4100 may drive components, an operating system (OS), a user program, a file system, or the like included in the user system 4000. For example, the application processor 4100 may include controllers, interfaces, graphics engines, and the like that control the components included in the user system 4000. The application processor 4100 may be provided as a system-on-chip (SoC). The application processor 4100 may generate a log for data requested by a user to write, allocate a section group and a section based thereon, and provide the data to which the section is allocated to the storage module 4400.

The memory module 4200 may operate as a main memory, an operation memory, a buffer memory, or a cache memory of the user system 4000. The memory module 4200 may include a volatile random access memory or a nonvolatile random access memory. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
a memory device including a plurality of memory dies; and
a memory controller configured to receive data and a log related to a property of the data from an external host,
allocate, in the memory device and based on the log, a super block, in which the data is to be stored, and a physical zone in the super block, and
store information for the log of the data, which is stored in the physical zone, and information indicating a time point, at which the physical zone is switched to a full state,
wherein the memory controller is further configured to control, according to a number of physical zones of an empty state, the memory device to perform garbage collection by selecting a victim physical zone based on the information for the log and the information indicating the time point, and
wherein a physical zone of the full state is full of data stored therein and a physical zone of the empty state has no data stored therein.

2. The storage device of claim 1, wherein the log is allocated according to a type and a temperature of the data.

3. The storage device of claim 2, wherein the memory controller is further configured to determine, according to the log of the data, the super block as one of a first super block including a plurality of first physical zones each including one or more memory blocks in one memory die, and a second super block including a plurality of second physical zones each including a portion of each of memory blocks included in different memory dies.

4. The storage device of claim 3, wherein data stored in the first physical zone has a size smaller than that of data stored in the second physical zone or an input/output frequency higher than that of the data stored in the second physical zone.

5. The storage device of claim 4, wherein the log of the data stored in the first physical zone is one of a hot node, a warm node, a cold node, and hot data.

6. The storage device of claim 4, wherein the log of the data stored in the second physical zone is one of warm data and cold data.

7. The storage device of claim 3, wherein each of the first and second physical zones has one state among the full state in which the empty area does not exist in the corresponding physical zone,
the empty state in which the corresponding physical zone is empty,
an active state in which data is stored only in a partial area in the corresponding physical zone, and
a ready-to-reset state in which a reset operation is performed on a super block including the corresponding physical zone to cause all second physical zones in the super block including the corresponding physical zone to be in the empty state by erasing all second physical zones in the super block including the corresponding physical zone but the reset operation is not completed on the super block including the corresponding physical zone according to a state of another second physical zone in the super block including the corresponding physical zone.

8. The storage device of claim 7, wherein the memory controller selects the victim physical zone from among the physical zones of the full state.

9. The storage device of claim 8, wherein the memory controller controls the memory device to perform the garbage collection by copying data stored in the victim physical zone and storing the copied data in a physical zone in another super block.

10. The storage device of claim 9, wherein the another super block in which the copied data is stored is a super block including the first physical zone when the victim physical zone is the first physical zone, and
a super block including the second physical zone when the victim physical zone is the second physical zone.

11. A method of operating a storage device comprising a memory device including a plurality of memory dies, and a memory controller configured to receive data and a log related to a property of the data from an external host, allocate, in the memory device and based on the log, a super block, in which the data is to be stored, and a physical zone included in the super block, the method comprising:
determining whether to perform garbage collection based on a number of physical zones of an empty state;
selecting candidate physical zones from among physical zones of a full state; and
determining a victim physical zone based on information for the log of the data, which is stored in each of the candidate physical zones, and information on a time point at which each of the candidate physical zones is switched to the full state; and
selecting the victim physical zone based on the information for the log of the data and the information indicating the time point,
wherein a physical zone of the full state is full of data stored therein and a physical zone of the empty state has no data stored therein.

12. The method of claim 11, further comprising determining the super block as one of a first super block including a plurality of first physical zones each including one or more memory blocks in one memory die, and
a second super block including a plurality of second physical zones each including a portion of each of memory blocks included in different memory dies.

13. The method of claim 12, wherein determining whether to perform the garbage collection comprises determining to perform the garbage collection when the number of the physical zones of the empty state is less than a first threshold value.

14. The method of claim 13,
wherein the candidate physical zone is selected, when the number of the physical zones of the empty state is less than a second threshold value less than the first threshold value, from physical zones in the super block including only the physical zones of the full state, and physical zones of a ready-to-reset state, and
wherein a physical zone becomes in the ready-to-reset state when a reset operation is performed on the second super block including the physical zone to cause all second physical zones in the second super block including the physical zone to be in the empty state by erasing all second physical zones in the second super block including the physical zone but the reset operation is not completed on the second super block including the physical zone according to a state of another second physical zone in the second super block including the physical zone.

15. The method of claim 14, wherein determining the victim physical zone comprises:
calculating a cost for each of the candidate physical zones based on the information for the log of the data stored in each of the candidate physical zones and information indicating the time point at which each of the candidate physical zones is switched to the full state;
calculating a cost of each of candidate super blocks, in which the candidate physical zones are respectively included, based on costs of all candidate physical zones in the candidate super blocks;
determining a victim super block by comparing the costs of the candidate super blocks; and
determining, as the victim physical zone, each of all candidate physical zones included in the victim super block.

16. The method of claim 15, further comprising:
moving data from the victim physical zone to a physical zone included in another super block; and
erasing the victim super block.

17. The method of claim 13, wherein determining the victim physical zone comprises:
calculating, when the number of the physical zones of the empty state is less than the first threshold value and greater than a second threshold value less than the first threshold value, a cost for each of the candidate physical zones based on the information for the log of the data, which is stored in each of the candidate physical zones and the information indicating the time point at which each of the candidate physical zones is switched to the full state; and
determining the victim physical zone by comparing the costs for the candidate physical zones.

18. The method of claim 17, further comprising:
moving data from the victim physical zone to a physical zone included in another super block; and
erasing the victim physical zone or switching the victim physical zone to the ready-to-reset state.

19. The method of claim 18,
wherein the victim physical zone is erased when the victim physical zone is the first physical zone, and
wherein the victim physical zone is switched to the ready-to-reset state when the victim physical zone is the second physical zone.

20. A storage device comprising:
a memory device including a plurality of memory dies; and
a memory controller configured to divide the memory device into a plurality of super blocks and control the memory device,
wherein each of one or more super blocks among the plurality of super blocks includes a plurality of physical zones each including a fraction of each of memory blocks included in different memory dies, and
wherein the memory controller is further configured to control the memory device to perform garbage collection based on information on the physical zones.

* * * * *